(12) United States Patent
Tai et al.

(10) Patent No.: US 7,626,730 B2
(45) Date of Patent: Dec. 1, 2009

(54) METHOD OF MAKING A MULTILEVEL HALFTONE SCREEN

(75) Inventors: Hwai-Tzuu Tai, Rochester, NY (US); Chung-Hui Kuo, Fairport, NY (US); Dmitri A. Gusev, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 629 days.

(21) Appl. No.: 11/394,490

(22) Filed: Mar. 31, 2006

(65) Prior Publication Data
US 2007/0236736 A1    Oct. 11, 2007

(51) Int. Cl.
*H04N 1/405* (2006.01)
*H04N 1/46* (2006.01)
*G03F 3/08* (2006.01)
*G06K 15/00* (2006.01)

(52) U.S. Cl. ............... 358/3.06; 358/3.13; 358/3.2; 358/536; 358/533; 358/521

(58) Field of Classification Search ............ 358/3.2, 358/536, 533, 521, 1.9, 3.01, 3.13
See application file for complete search history.

(56) References Cited

U.S. PATENT DOCUMENTS

| | | |
|---|---|---|
| 5,111,310 A | 5/1992 | Parker et al. .......... 358/456 |
| 5,258,850 A | 11/1993 | Tai |
| 5,396,584 A | 3/1995 | Lee et al. .............. 395/132 |
| 5,477,305 A | 12/1995 | Parker et al. .......... 358/456 |
| 5,519,791 A | 5/1996 | Webb et al. ............ 382/252 |
| 5,535,020 A | 7/1996 | Ulichney ............... 358/457 |
| 5,553,165 A | 9/1996 | Webb et al. ............ 382/252 |
| 5,726,772 A | 3/1998 | Parker et al. .......... 358/456 |
| 5,734,752 A | 3/1998 | Knox ................... 382/212 |
| 5,859,955 A | 1/1999 | Wang |

(Continued)

FOREIGN PATENT DOCUMENTS

| EP | 0 843 462 A2 | 5/1998 |
|---|---|---|
| WO | WO 91/12686 A | 8/1991 |

OTHER PUBLICATIONS

Joan L. Mitchell et al., "Multilevel Color Halftoning," IS&T/SID Ninth Color Imaging Conference, pp. 189-193 (2001).

(Continued)

*Primary Examiner*—Edward L Coles
*Assistant Examiner*—Sunil Chacko
(74) *Attorney, Agent, or Firm*—Justin D. Petruzzelli; Eugene I. Shkurko

(57) ABSTRACT

A three-dimensional halftone screen is provided that is suited for multilevel printing. The three-dimensional halftone screen includes a plurality of planes each corresponding to one or more input intensity levels of an input RIPped pixel. Within the planes are screen dots, each associated with one or more output exposure intensity values representing an intensity of an exposure dot corresponding to the input RIPped pixel.

23 Claims, 15 Drawing Sheets

U.S. PATENT DOCUMENTS

| | | | |
|---|---|---|---|
| 5,946,455 A | 8/1999 | Tresser et al. | 395/109 |
| 5,956,157 A | 9/1999 | Tai | 358/455 |
| 6,278,802 B1 | 8/2001 | Delabastita | 382/251 |
| 6,433,891 B1 | 8/2002 | Yu et al. | 358/1.9 |
| 6,493,112 B1 | 12/2002 | Arce et al. | 358/3.19 |
| 6,606,168 B1 | 8/2003 | Rylander | 358/3.09 |
| 6,798,537 B1 | 9/2004 | Lau et al. | 358/1.9 |
| 6,842,184 B2 | 1/2005 | Huang et al. | 345/596 |
| 7,271,936 B2* | 9/2007 | Walmsley et al. | 358/3.06 |
| 7,457,004 B2* | 11/2008 | Asai et al. | 358/3.06 |
| 2002/0171873 A1 | 11/2002 | Chang | |
| 2003/0053136 A1 | 3/2003 | Chang | |
| 2003/0123093 A1* | 7/2003 | Hattori | 358/3.06 |
| 2004/0091168 A1* | 5/2004 | Jones et al. | 382/261 |
| 2004/0223189 A1* | 11/2004 | Bhattacharjya | 358/3.11 |
| 2006/0066908 A1 | 3/2006 | Kim | |

OTHER PUBLICATIONS

Victor Ostromoukhov, "Pseudo-Random Halftone Screening For Color and Black & White Printing" Peripheral Systems Laboratory, Swiss Federal Institute of Technology (EPFL), IN-F, CH-1015 Lausanne, Switzerland, pp. 1-8 (1993).

American Institute of Aeronautics and Astronautics, Kikuo Fujita, Noriyasu Hirokawa and Tomoya Tachikawa, "Voronoi Diagram Based Cumulative Approximation for Engineering Optimization", Department of Computer-Controlled Mechanical Systems, Graduate School of Engineering, Osaka University, Suita, Osaka 565-0871, Japan, AIAA-2000-4919, pp. 1-11 (2000).

Victor Ostromoukhov, Roger D. Hersch, "Stochastic Clustered-Dot Dithering", Ecole Polytechnique Federale, Lausanne, (EPFL), pp. 1-10 (1999).

U.S. Appl. No. 09/629,993, filed Aug. 1, 2000, Tai et al.

* cited by examiner

EXPOSURE DOT

METHOD OF MAKING A MULTILEVEL HALFTONE SCREEN

CROSS-REFERENCE TO RELATED APPLICATION

This application claims the benefit of U.S. Non-Provisional patent application Ser. No. 11/394,770, titled "MULTILEVEL HALFTONE SCREEN AND SETS THEREOF", filed concurrently herewith, the entire disclosure of which is hereby incorporated herein by reference.

FIELD OF THE INVENTION

This invention relates to a multilevel halftone screen and sets thereof. In particular, this invention relates to a multilevel halftone screen and sets thereof suitable for, among other things, lower-resolution multilevel printing devices, such as electrophotographic printing devices, computer-to-plate ("CTP") printing devices, direct imaging ("DI") printing devices, dye sublimation printing devices, and lower-resolution ink-jet printing devices.

BACKGROUND OF THE INVENTION

FIG. 1 illustrates conventional workflows for acquiring images, rasterizing the acquired images into "digital contone" data, and manipulating the digital contone data into a format compatible to a printing device. In particular, FIG. 1 illustrates that various input sources 102, 104, 106 may be used to acquire an image by various image capture devices 108, 110, 112 and converted into a digital data file 114. For example, a digital camera 108 may take a digital picture of an analog contone scene 102 and convert the picture into a digital file 114. Examples of digital files 114 include a JPG file, a TIFF file, and any other digital file format known in the art. FIG. 1 also illustrates that a scanner 110 may be used to digitally scan a hardcopy print 104 and convert the digital scan into a digital file 114. Also, graphic design software 112 may be used to generate a graphic design 106 and to save such design as a digital file 114.

The digital file 114 includes a plurality of "pixels" arranged in a two-dimensional array. Each pixel includes intensity data associated with red, green, and blue color separations. However, the printing devices 116, 118, and 120 print images according to four different color separations cyan, magenta, yellow, and black, commonly denoted by CMYK, respectively. Accordingly, if a user desires to print the digital file 114 with any one of the printers 116, 118, 120, software, hardware, or both may be used as a Raster Image Processor "RIP" 122 to rasterize the digital file 114 into "digital contone" CMYK data 124. Specifically, the RIP 122 converts the digital red, green, and blue data in the digital file 114 into CMYK data 124.

In addition, the printers 116, 118, 120 typically have a much greater printing resolution than the image acquisition resolution of the devices 108, 110, 112. Accordingly, the RIP 122 typically increases the resolution of the image data it processes such that the digital contone CMYK data 124 has a greater resolution than the digital file 114. In other words, a "pixel" in the digital file 114 may correspond to several "RIPped pixels" in the digital contone CMYK data 124. A single RIPped pixel is illustrated with reference numeral 126.

In order to be printed, the digital contone CMYK data 124 is subjected to a halftone process 130 and converted to "ready-to-print" ("RTP") data 128 that is compatible with the printing device that will print the RTP data. The RTP data 128 typically has the same or a greater resolution than the digital contone CMYK data 124. Accordingly, a RIPped pixel, such as RIPped pixel 126, typically corresponds to one or more elements of the RTP data 128, such elements being referred to herein as "exposure dots." A single exposure dot is illustrated, for example, with reference numeral 138.

Depending upon the printer 116, 118, 120 being used and the type of image being printed, one of several halftone processes may be used, such as halftone processes 130. For example, if an operator wants to use the printer 116, the user may select the threshold halftone process 132 to convert the digital contone CMYK data 124 into the RTP data 134. In conventional threshold halftone processes, if an intensity of an input RIPped pixel 126 is greater than or equal to a threshold, then an exposure dot in the RTP data 134 corresponding to the RIPped pixel 126 is set to an ON value, indicating that an exposure dot is to be printed at that location. If the intensity value of the RIPped pixel 126 is lower than the threshold, then a corresponding exposure dot in the RTP data 134 is set to OFF, indicating that no exposure dot will be printed at that location.

If the user desires to print with printer 118, the user may select patterned dot halftoning 140 in order to generate the RTP data 142. According to patterned dot halftoning, depending upon the intensity value of the input RIPped pixel 126 and the relative resolutions of the printer 118 and the digital contone CMYK data 124, one of a plurality of patterns 144 will be used to generate a pattern of exposure dots in a halftone cell 146. In the example of FIG. 1, the halftone cell 146 corresponds to a RIPped pixel from the digital contone CMYK data 124 and comprises four exposure dots. In this case, the halftone cell 146 can represent five different intensity levels: (1) where all four exposure dots in the halftone cell 146 are "off"; (2) where one of the four exposure dots in the halftone cell 146 are "on," and the rest are "off"; (3) where two of the four exposure dots in the halftone cell 146 are "on," and the rest are "off"; (4) where three of the four exposure dots in the halftone cell 146 are "on," and the other exposure dot is "off"; and (5) where all of the exposure dots in the halftone cell 146 are "on." In this example, if the RIPped pixel being processed has an intensity value associated with little or no intensity, pattern (1) may be used for the corresponding halftone cell. If the RIPped pixel being processed has an intensity value associated with a higher level of intensity, pattern (2) may be used, and so on.

If a user desires to print the data 124 with a multilevel printer 120, the user may select the multilevel halftone process 148. A multilevel printer, as opposed to a binary printer, is able to print a single exposure dot having one of multiple intensities. For example, an 8-bit multilevel printer 120 can print any one exposure dot with one of 256 different exposure levels. In contrast, a binary printer can either print a single exposure dot with one of two intensity values: "on" or "off." Accordingly, the multilevel halftone process 148 generates RTP data 150 with exposure dots 152 having one of a plurality of different exposure intensity levels, depending upon the capabilities of its associated multilevel printer. FIG. 2 illustrates exposure dots of a binary printer and FIG. 3 illustrates exposure dots of a multilevel printer. FIG. 4 illustrates a histogram of the digital contone CMYK data 124 and the resulting histogram of the RTP data 150 (also referred to as "multilevel halftone data") after a multilevel halftone process 148 has been performed.

The halftone processes 130 are performed for each of the C, M, Y, and K color separations in the digital contone CMYK data 124. Accordingly, separate RTP data 128 is generated for and corresponds to each of the color separations C, M, Y, and K of the data 124. Further, the halftone processes use "screens," which are essentially tables that are used to determine what RTP data should be output for the corresponding digital contone CMYK data 124. Typically, one screen is used for each color separation.

FIG. 5A illustrates a halftone screen 501 for a cyan color separation. The screen 501 has multiple "screen dots" 502 that represent locations where an exposure dot in the RTP data 504 will have a non-zero exposure intensity. In other words, screen dots 502 represent locations where a dot will be printed by a printing device. In order to generate the RTP data 504, the screen 501 is superposed, typically at an angle, on the digital contone data 505. Commonly, the halftone screen 501 is smaller (has a lower resolution) than the digital contone data 505 to which it is to be applied. Accordingly, the halftone screen 501 is tiled as it is superposed, typically at an angle, on the digital contone data 505, as shown at 506 in FIG. 5A. Each screen dot 502 translates the intensity value of the pixel it overlays into a corresponding exposure dot 503 having a particular exposure intensity value, as shown, for example, at 507 in FIG. 5A.

Conventionally, there have been two different types of halftone screens: AM screens and FM screens. An AM screen, shown, for example, at 510 in FIG. 5B, refers to an amplitude-modulated screen, which includes screen dots having a regular pattern. In contrast, an FM screen, shown, for example, at 511 in FIG. 5B, refers to a frequency-modulated screen, which exhibits screen dots having a random pattern. An FM screen also is referred to as a "stochastic screen."

In order to produce pleasing images using AM screens, a set of AM screens are produced where each screen is configured for one of the CMYK color separations, and the screens are superposed on their corresponding digital contone data at particular angles. Typically, when the screens are superposed, the cyan screen is oriented at 15 degrees over its corresponding digital contone data, the magenta screen is oriented at 75 degrees, the black screen is oriented at 45 degrees, and the yellow screen is oriented at zero degrees. When each of these screens are overlayed at these specific angles, their screen dots produce a pleasing microstructure called a rosette structure that the human eye does not readily notice. However, interference patterns of screen dots called moiré patterns appear and occasionally degrade image quality when conventional AM screens are applied.

FM screens do not have the problems associated with the distracting moiré interference pattern. However, worm-like artifacts can be generated when using FM screens due to connections between screen dots in higher parts of the tone scale, i.e. parts of the tone scale where exposure intensity is high and screen dots are large and begin to join.

Further, although FM screens work well for high-resolution printing (approximately 5,000 or more dots per inch), such as that performed by high-resolution ink jet printers, they have been less effective for lower-resolution printing (approximately 2,000 or fewer dots per inch), such as electrophotographic, flexographic, direct imaging ("DI"), dye sublimation, and lower-resolution ink-jet printing devices. For example, electrophotographic ("EP") printing and flexographic printing are not presently capable of printing at the resolutions offered by ink jet printing, because these methods of printing have a larger minimum exposure dot size than that of high-resolution ink jet printing. To elaborate, EP printing transfers toner to a printing substrate by adding spots of electric charge to an image cylinder, which attracts toner. The toner is then transferred to a substrate, such as paper. If the exposure dot size is too small, too small of a charge is added to the image cylinder to attract toner properly. Consequently, too little or no toner will be transferred to the substrate. In the case of flexographic printing, raised exposure dots are formed on a flexible printing plate. Ink is then applied to the flexible printing plate, and the raised exposure dots transfer the ink by contact to a substrate. If the raised exposure dots are too small on the printing plate, ink will not be properly transferred to the printing plate. Similar problems exist for other lower-resolution printing techniques. Because FM screens, however, offer advantages over AM screens, such as elimination of the moiré interference pattern, an FM screen that produces high quality images without artifacts for lower-resolution printing processes is desired.

SUMMARY OF THE INVENTION

The above-described problems are addressed and a technical solution is achieved in the art by a multilevel halftone screen set according to the present invention. In an embodiment of the present invention, a three-dimensional ("3D") halftone screen suitable for, among other things, lower-resolution multilevel printing, is provided and stored in a computer-accessible memory system. Examples of lower-resolution multilevel printing include electrophotographic, computer-to-plate ("CTP"), direct imaging ("DI"), dye sublimation, and lower-resolution ink-jet printing. The 3D halftone screen, according to various embodiments of the present invention, includes a first plurality of planes of first data structures. Each of the first plurality of planes corresponds to one or more intensity levels of an input RIPped pixel. Each data structure in the planes is associated with an exposure intensity level of a multilevel printing device. An output exposure intensity level corresponding to an input RIPped pixel is determined by selecting one of the plurality of planes based at least upon the intensity of the input RIPped pixel and by selecting a data structure in the selected plane based at least upon coordinates of the input RIPped pixel.

Within the planes of the 3D halftone screen are screen dots that correspond to the data structures associated with nonzero exposure intensities. Depending upon a screen dot's size, one or a plurality of contiguous data structures may be used to describe a screen dot. In other words, one or a plurality of contiguous data structures may be used to represent a screen dot in data. The term "contiguous" is intended to refer a logical grouping of data, such as adjacent elements in an array, even though the actual data elements may be located in remote, non-contiguous locations in a computer-accessible memory system.

According to an embodiment of the present invention, the screen dots each have a nucleus that remains in the same or substantially the same location throughout the planes of the 3D halftone screen. Each of the screen dots also include a peripheral region that grows in size from each plane to the next one, in a direction corresponding to increasing intensity of the input RIPped pixel.

According to another embodiment of the present invention, the exposure dot intensity or intensities represented by each of the screen dots increases between planes in a direction of increasing intensity of the input RIPped pixel.

According to yet another embodiment of the present invention, the sizes of the screen dots on any particular plane are substantially equal, but generally are not equal. A benefit of having substantially equal screen dots on any particular plane, especially planes associated with higher intensity levels, is that it provides control of how screen dots connect in order to suppress worm-like artifacts. A benefit, however, of not having exactly equal screen dot sizes on any particular plane, especially planes associated with lower intensity levels, is that it allows for more stable toner/ink transfer. Stated differently, it has been determined that slightly irregular or varying screen dot sizes, especially in the toe region (i.e., the lower-intensity regions) of the tone scale where screen dots are small, assists with stable toner/ink transfer, especially for lower-resolution printing devices that do not respond well to small screen dot sizes. In this regard, according to still yet another embodiment of the present invention, the screen dot sizes in the planes corresponding to the toe region of the tone scale are increased to increase stability of toner/ink transfer, especially for lower-resolution printing devices.

According to a further embodiment of the present invention, the screen dot nuclei are stochastically arranged in a plane of the 3D halftone screen. According to another embodiment, the screen dot nuclei in one or more planes are stochastically arranged, and in one or more other planes, the screen dot nuclei are regularly arranged. In one embodiment, the screen dot nuclei are regularly arranged in the midtone planes, and are stochastically arranged in the other planes.

According to an embodiment of the present invention, the 3D halftone screen exhibits a green noise power spectrum, i.e., a medium frequency peak between approximately 150 and approximately 250 lines per inch. A green noise power spectrum, although not required, is useful for lower-resolution printing devices. According to another embodiment, the 3D halftone screen exhibits a variable screen dot frequency between different planes.

According to a further embodiment of the present invention, one 3D halftone screen is generated for each color separation. Each of the 3D halftone screens may have a different average screen dot frequency to assist in the suppression of image artifacts. Further, one or more of the 3D halftone screens may be FM screens, and one or more of the 3D halftone screens may be AM screens.

According to still yet another embodiment of the present invention, an input intensity value of a RIPped pixel, as well as the coordinates of the RIPped pixel, are received by a multilevel processing system. Based at least upon the intensity value of the RIPped pixel, a plane in a 3D halftone screen is selected by the processing system. Based at least upon the coordinates of the RIPped pixel, a location in the selected plane that corresponds to the coordinates of the RIPped pixel is determined by the processing system. An exposure value associated with the location in the plane that corresponds to the coordinates of the RIPped pixel is determined and output by the processing system.

According to still yet another embodiment of the present invention, the 3D halftone screen is generated by a processing system at least by receiving an identification of a tile shape, a tile size, a tile angle, and a screen dot frequency. A tile meeting the definition of the identified tile shape, size, angle, and frequency is generated with random screen dot nuclei placement. An algorithm such as the Voronoi algorithm, known in the art, is used to redistribute the screen dot nuclei randomly placed in a generated tile, such that the redistribution of the screen dot nuclei produces a spectrum with a frequency distribution centered around the identified frequency. Growth of the screen dots between planes is performed by an algorithm that grows the screen dots towards adjacent screen dots at a rate that provides for contact with all adjacent screen dots simultaneously or nearly simultaneously. An averaging filter may then be applied to the generated tile and associated planes. Such tiles may then be converted to an equivalent zero-degree tile and repeated in a brick-like or other tiling structure known in the art, such as the Holladay tiling structure. After tiling, the 3D halftone screen may be applied to an input image, which may be digital contone data.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

The various embodiments of the present invention described herein disclose three-dimensional ("3D") halftone screens suitable for multilevel printing. Not only do the 3D halftone screens described herein exhibit characteristics that make them suitable screens for lower-resolution printers, such as EP, CTP, DI, dye sublimation, and lower-resolution ink-jet printers, but their characteristics make them useful screens generally. For example, the sizes of the screen dots on any particular plane of the 3D halftone screens described herein are substantially equal in order to control how screen dots connect. This technique suppresses worm like artifacts common in conventional FM screens, regardless of the printer being used. In addition, the screen dot sizes on any particular plane of the 3D halftone screens described herein generally are not exactly equal, in order to allow for stable toner/ink transfer. While stable toner/ink transfer is useful for lower resolution printing techniques, it also is useful for nearly any other printing technique. To further improve print quality, the screen dot sizes in the 3D halftone screen are increased in the toe region of the tone scale to increase stability of toner/ink transfer. In this regard, the screen dots may be spread out to reduce the effects of increasing the screen dot sizes on these planes. Again, while stable toner/ink transfer is useful for lower resolution printing techniques, it also is useful for other printing techniques. Accordingly, a person having ordinary skill in the art will appreciate that the 3D halftone screens described herein may be used for any multilevel printing process.

Figure 1:
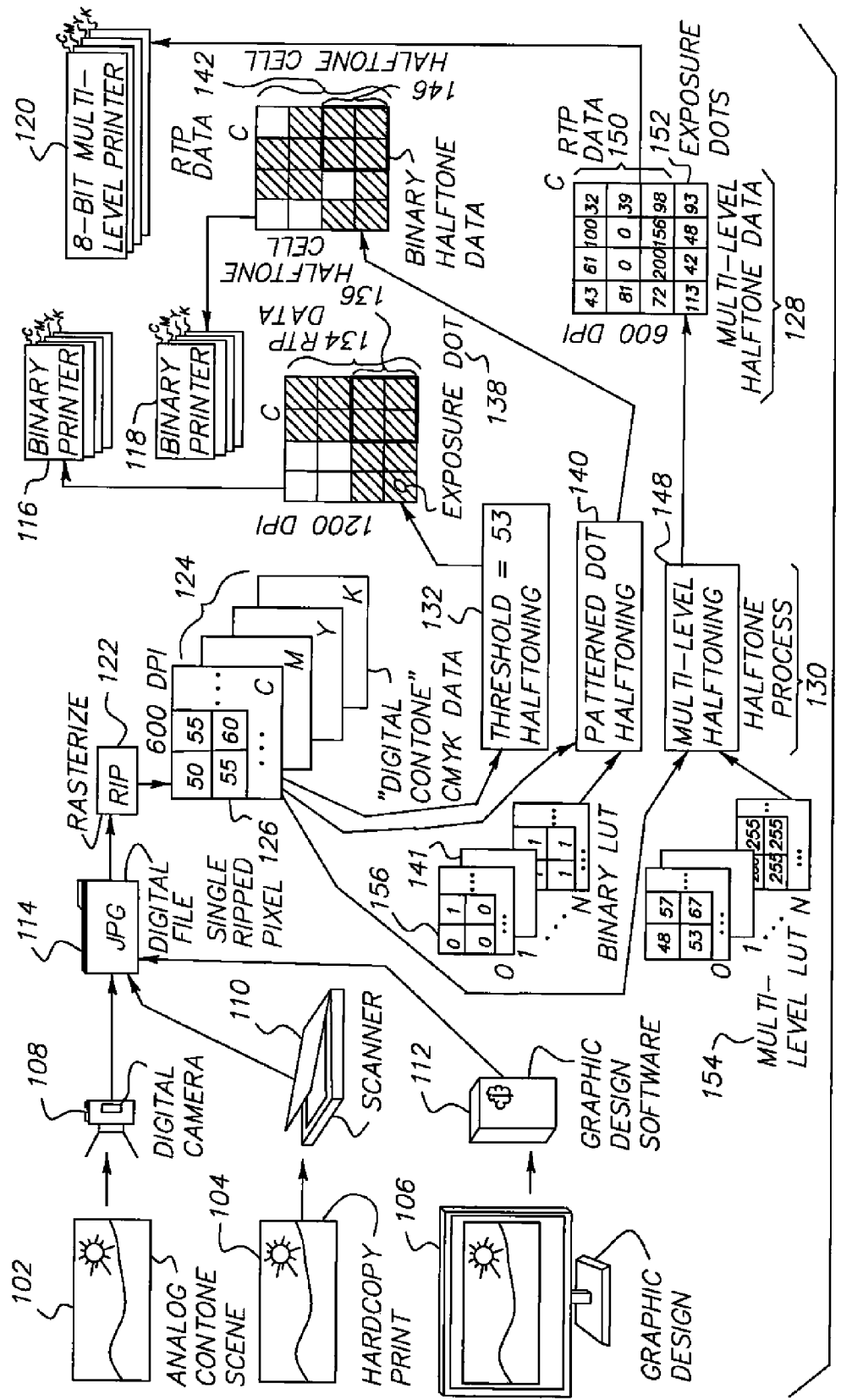
FIG. 1 illustrates conventional image processing, halftone, and printing techniques.
Figure 2:
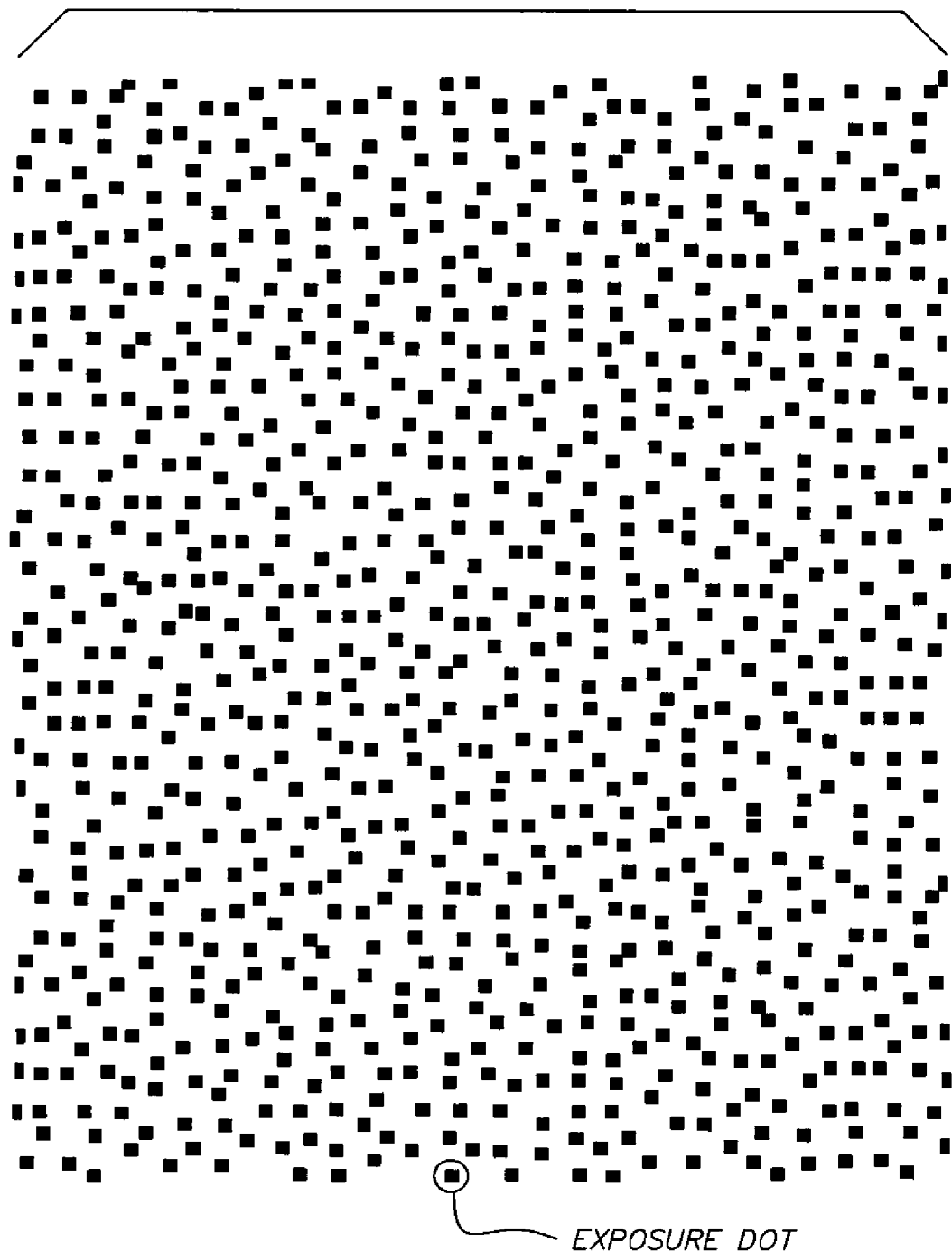
FIG. 2 illustrates conventional binary printing.
Figure 3:
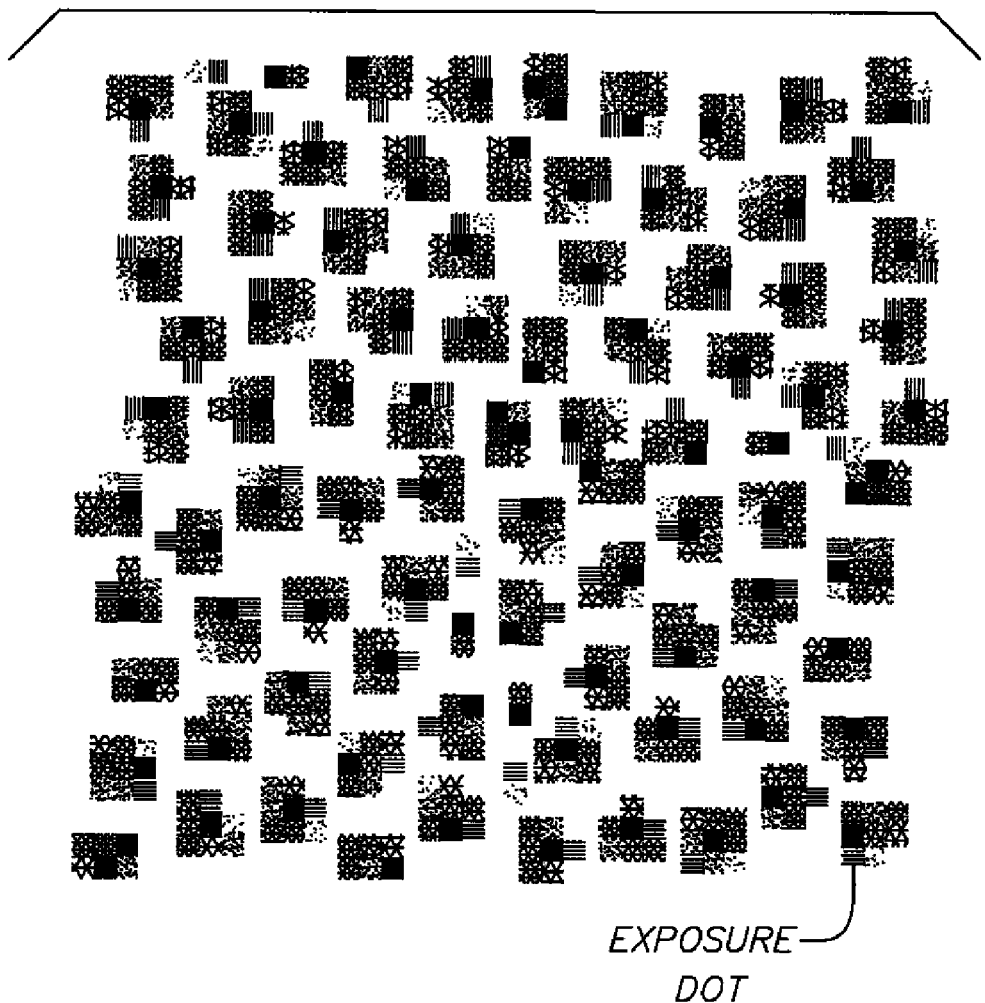
FIG. 3 illustrates conventional multi-level printing.
Figure 4:
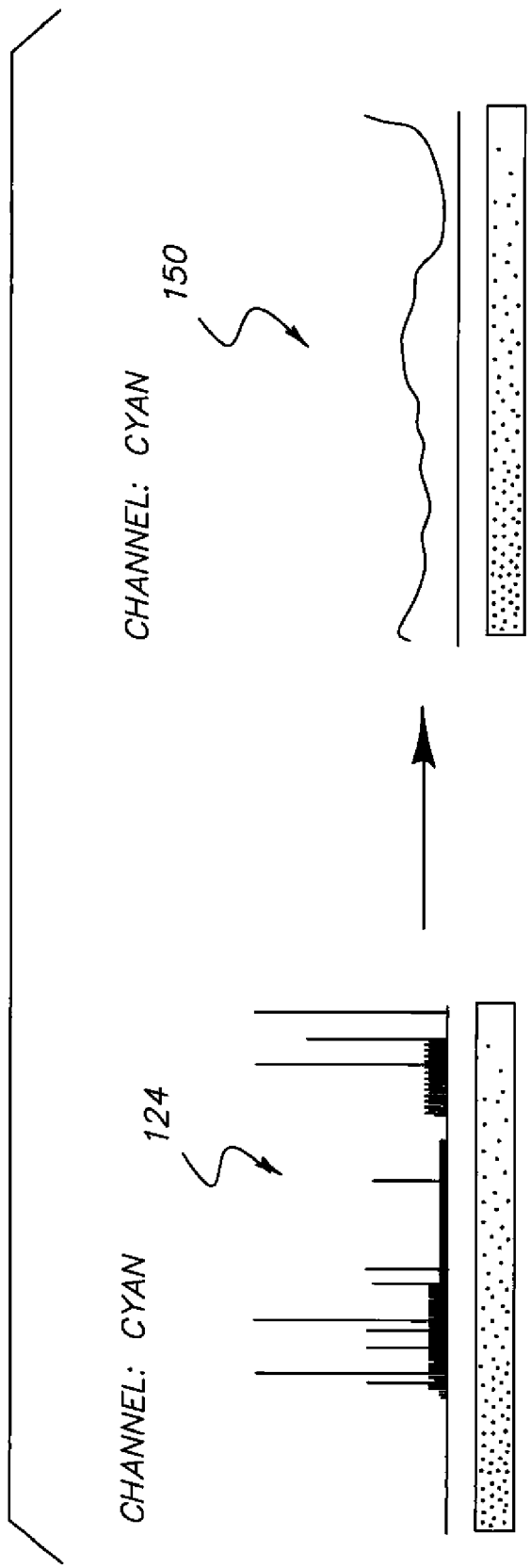
FIG. 4 illustrates a histogram of digital contone data and a histogram of multilevel-halftone-processed digital contone data.
Figure 5A:
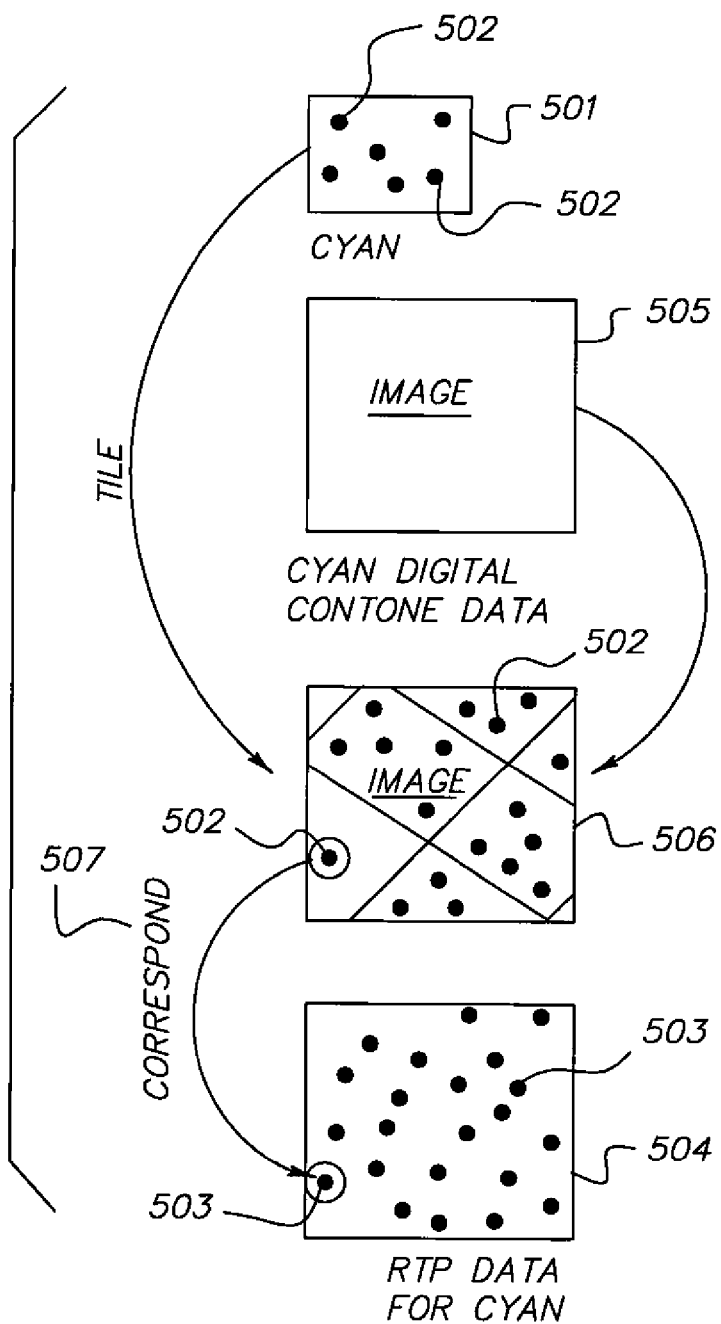
FIG. 5A illustrates conventional halftone processes.
Figure 5B:
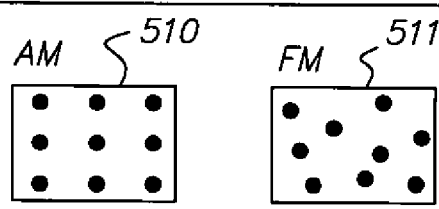
FIG. 5B illustrates a conventional AM halftone screen and a conventional FM halftone screen.
Figure 6:
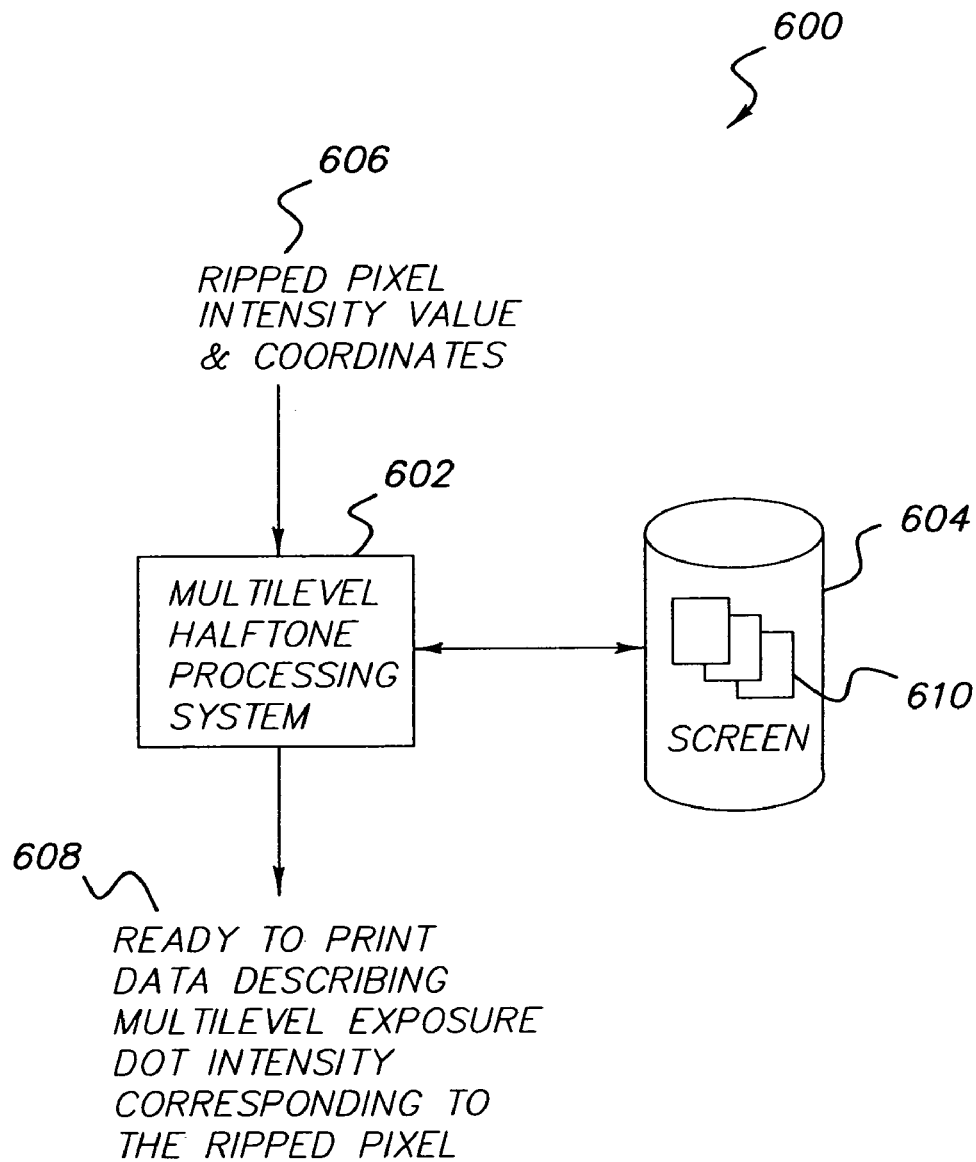
FIG. 6 illustrates a multilevel halftone processing system, according to an embodiment of the present invention.

Turning now to FIG. 6, a multilevel halftone processing system 600 according to an embodiment of the present invention will be described.

RIPped pixel data 606 from digital contone CMYK data 124 is input into a multilevel halftone processing system 602 a pixel at a time (in a serial data processing system). However, one skilled in the art will appreciate that a parallel data processing arrangement may be used. Further, although RIPped pixel data 606 is commonly described herein as being input into the multilevel halftone processing system 602, one skilled in the art will appreciate that the pixel data 606 need not be rasterized digital contone CMYK data, and may be other forms of image data. The RIPped pixel data 606 describes an intensity value of each RIPped pixel and the coordinates (often times X and Y coordinates) of each RIPped pixel.

The multilevel halftone processing system 602 includes one or more processors capable of generating an exposure intensity value in a ready-to-print ("RTP") format corresponding to an input RIPped pixel. An exposure intensity value describes an exposure intensity of a dot formed by a multilevel printer. Exposure intensity, as used herein refers to a level of darkness and/or a size of a dot formed by a multilevel printing device. In order to generate the exposure dot intensity value 608 corresponding to an input RIPped pixel, the multilevel halftone processor refers to a 3D halftone screen 610 stored in a data storage system 604. The 3D halftone screen 610 is any one of the 3D halftone screens described herein according to the various embodiments of the present invention. The data storage system 604 is communicatively connected to the multilevel halftone processing system 602.

The data storage system 604 may include one or more computer-accessible memories. The data storage system 604 may be a distributed data-storage system including multiple computer-accessible memories communicatively connected via a plurality of computers and/or devices. On the other hand, the data storage system 604 need not be a distributed data storage system and, consequently, may include one or more computer-accessible memories located within a single computer or device. In this regard, although the data storage system 604 is shown separately from the multilevel halftone processing system 602, one skilled in the art will appreciate that the data storage system 604 may be stored completely or partially within the multilevel halftone processing system 602.

The term "computer" and the term "processor" are intended to refer to any data processing device capable of processing data, and/or managing data, and/or handling data, whether implemented with electrical and/or magnetic and/or optical and/or biological components, and/or otherwise.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired, wireless, or both, between devices (such as computers and/or processors), and/or programs in which data may be communicated. Further, the phrase "communicatively connected" is intended to include a connection between devices and/or programs within a single computer or processor, a connection between devices and/or programs located in different computers or processors, and a connection between devices not located in computers or processors at all.

The multilevel halftone processing system 602 generates the RTP data 608 based at least upon the RIPped pixel data 606. In particular, the multilevel halftone processing system 602 selects a plane of a plurality of planes in the 3D halftone screen 610 based at least upon the intensity value of a RIPped pixel. Having identified a plane associated with the intensity value of the RIPped pixel, the multilevel halftone processor selects a location in the selected plane based at least upon the coordinates of the RIPped pixel. The selected location within the selected plane of the 3D halftone screen 610 identifies the exposure dot intensity value to be output as the RTP data 608 corresponding to the input RIPped pixel.

Figure 7:
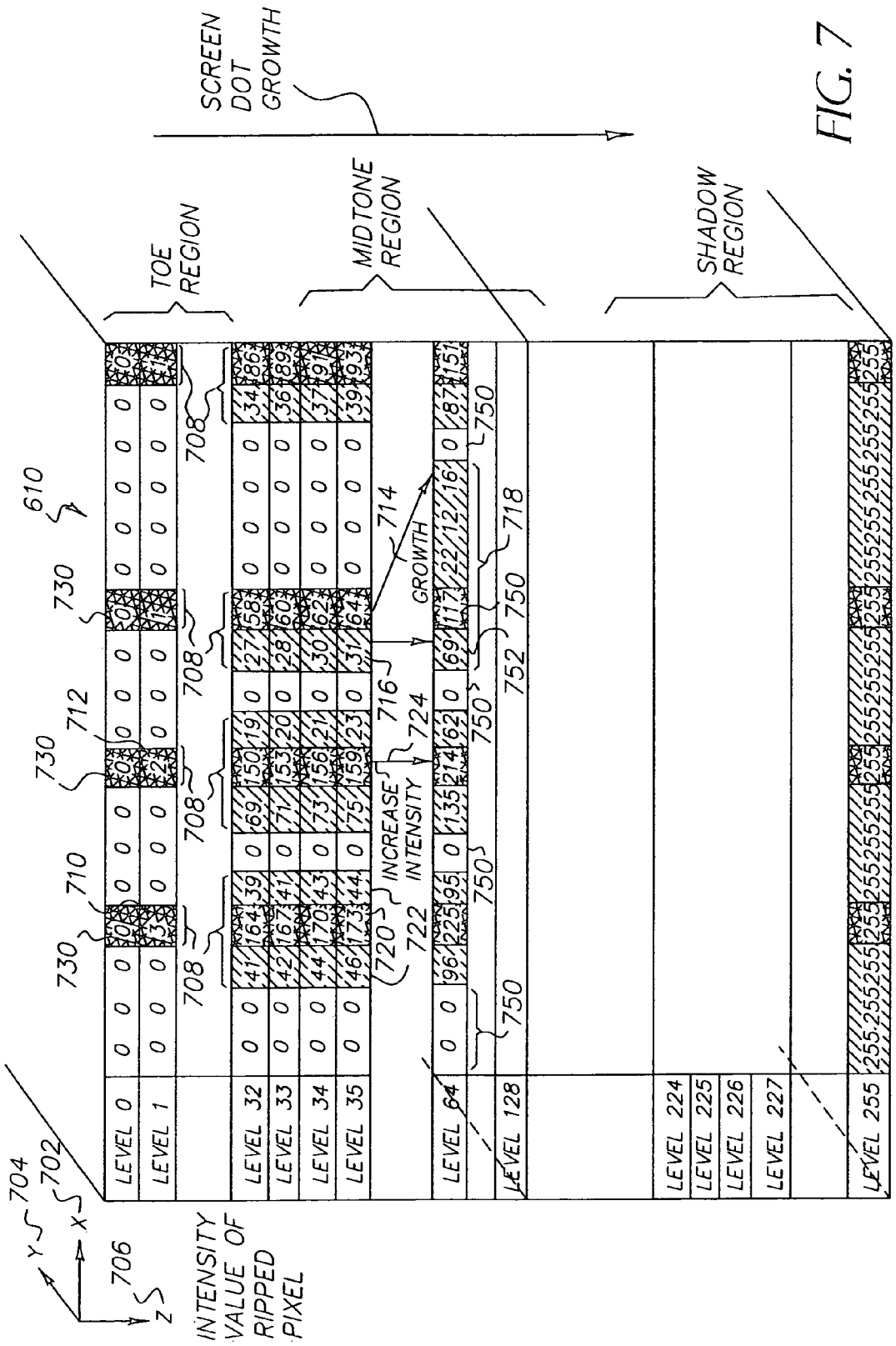
FIG. 7 illustrates a multilevel halftone screen, according to an embodiment of the present invention.

FIG. 7 illustrates in detail a structure of the 3D halftone screen 610, according to an embodiment of the present invention. The halftone screen 610, according to the embodiment of FIG. 7, has three dimensions: an X-axis 702, a Y-axis 704, and a Z-axis 706. The X- and Y-axes 702, 704 are associated with the coordinates of the input RIPped pixel data 606. The Z-axis 706 (also referred to as the "tone scale") is associated with the intensity value of the input RIPped pixel data 606. Accordingly, the halftone screen 610 has a plurality of planes, referred to as level zero, level 1, . . . level 32, level 33, level 34, . . . etc., each associated with an intensity value of an input RIPped pixel. However, one skilled in the art will appreciate that a plane in the halftone screen may be associated with more than one intensity value of the input RIPped pixel.

Figure 8:
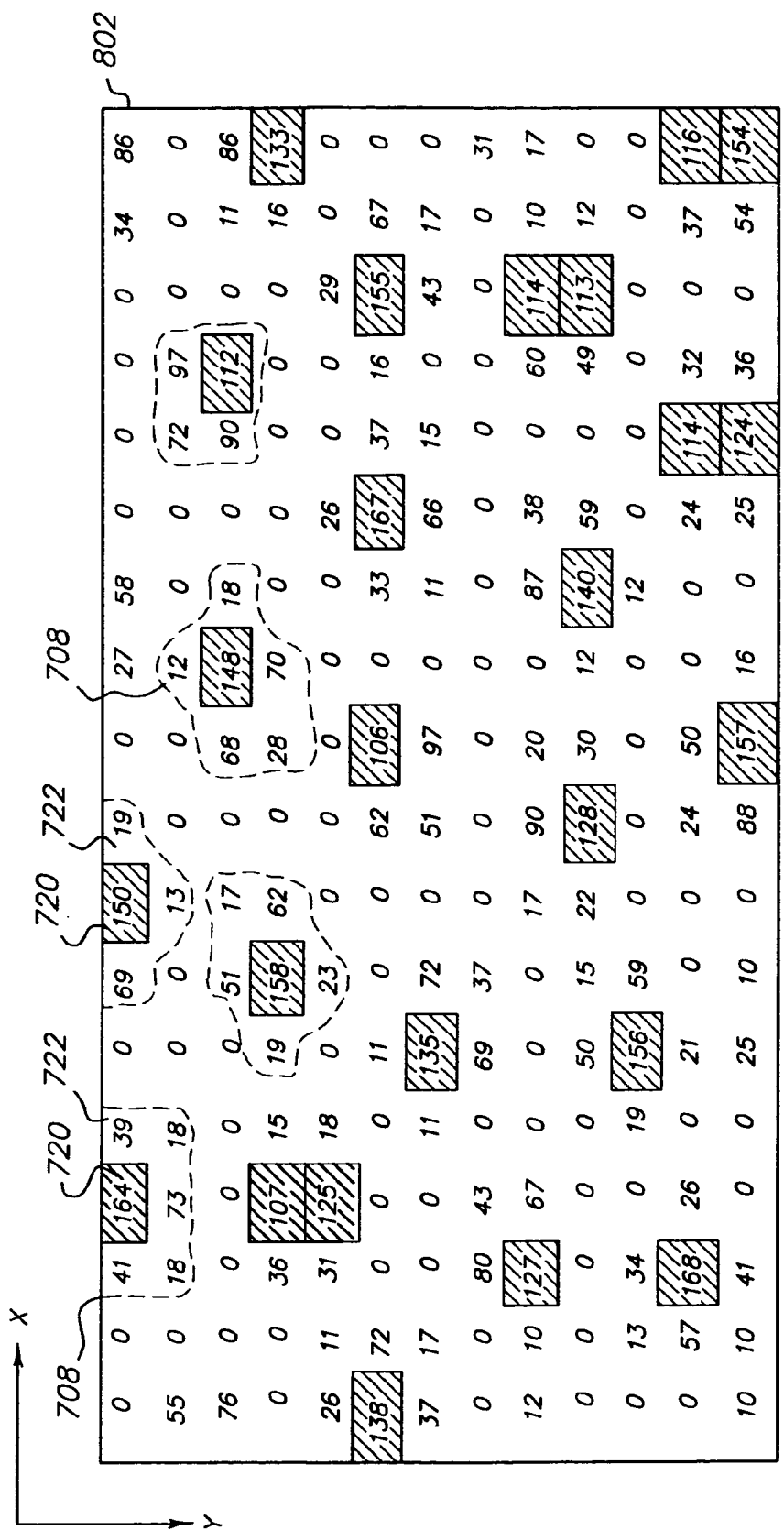
FIG. 8 illustrates a plane of the multilevel halftone screen of FIG. 7, according to an embodiment of the present invention.

Each of the planes represents a map of exposure dots, best shown with FIG. 8, where each number in plane level 32 shown in FIG. 8 represents an exposure dot having an exposure intensity value represented by such number. Further, each plane, except plane level zero associated with an input RIPped pixel intensity value of zero (no intensity), has a plurality of screen dots 708, some of which are shown in cross-section by reference numeral 708 in FIG. 7. It should be noted, however, that semantically, plane level zero may be considered to have screen dots 730 associated with no exposure intensity. For ease of discussion, however, screen dots will be described as being associated with a non-zero exposure intensity. In this regard, the screen dots are associated with one or more exposure dots printed by a multilevel printing device. For example, the screen dot 710 in plane level 1 is associated with an exposure intensity value of 3, which may represent a small or a light dot printed by a multilevel printing device. If an input RIPped pixel has an intensity value of 1 and its coordinates associated it with screen dot 710, an exposure dot intensity value of 3 is output as RTP data 608.

As the halftone screen 610 progresses along the Z axis 706, the screen dots in the planes become larger. Such growth is illustrated, for example, with reference numeral 714. Growth 714 illustrates that the cross-section of screen dot 716 in plane level 35 shown in FIG. 7 grows from encompassing two exposure dot intensity values to encompassing five exposure dot intensity values in plane level 64, as shown by exposure dot cross-section 718. Although not shown in FIG. 7, the exposure intensities associated with the screen dots 708 in the toe region of a tone scale may have increased exposure intensities to allow more stable transfer of ink or toner for lower-resolution printing techniques. In addition, the screen dots 708, as well as growing in size along the Z-axis 706, also increase in intensity along the Z axis 706, as shown by reference numeral 724.

The screen dots 708 each include a nucleus 720, which stays in the same or substantially the same location from plane to plane. The nucleus 720 represents the theoretical center (in a real-number space) of a screen dot, or the exposure dot (in the integer number/digital space represented by the halftone screen 610) in which the theoretical center resides. For example, the theoretical center of the screen dot 718 in FIG. 7 may reside at a location between exposure dot 750 and exposure dot 752, but somewhere closer to the center of exposure dot 750. In the process of digitizing the screen dots (converting from a real-number space to an integer-number space, described in detail below), exposure dot 750 becomes the exposure dot in which the theoretical center resides and is considered the nucleus of the screen dot 718 in an integer-number space.

As the screen dots grow in size along the Z-axis 706, they include growing peripheral regions 722. The peripheral regions 722 border or surround the screen dot nucleus 720, as shown in FIG. 8.

FIG. 8 illustrates plane level 32 of the halftone screen 610, such that the exposure dot intensities shown in FIG. 7 at level 32 correspond to the exposure dot intensities illustrated along the first row 802 of FIG. 8. Hence, one can say that FIG. 8 shows the underneath of plane level 32 shown in FIG. 7. As is illustrated by FIG. 8, the screen dot sizes on any particular plane are substantially equal in order to control how screen dots begin to connect as the screen dots grow along the Z-axis. This requirement assists in the reduction of worm-like artifacts common to conventional FM screens. FIG. 8 also illustrates, however, that the screen dots are not all of equivalent size, and that subtle variations in size between screen dots exists In other words, the screen dots 708 have a slightly irregular shape. This feature allows for more stable transfer of toner/ink, especially for lower-resolution printing devices. In particular, it has been determined that slightly irregular or varying screen dot sizes, especially in the toe region of the tone scale where screen dots are small, assists with stable toner/ink transfer, especially for lower-resolution printing devices that do not respond well to small screen dot sizes. The mechanics of how the features discussed in this paragraph are enforced will be described in more detail below with respect to FIG. 9.

Figure 12:
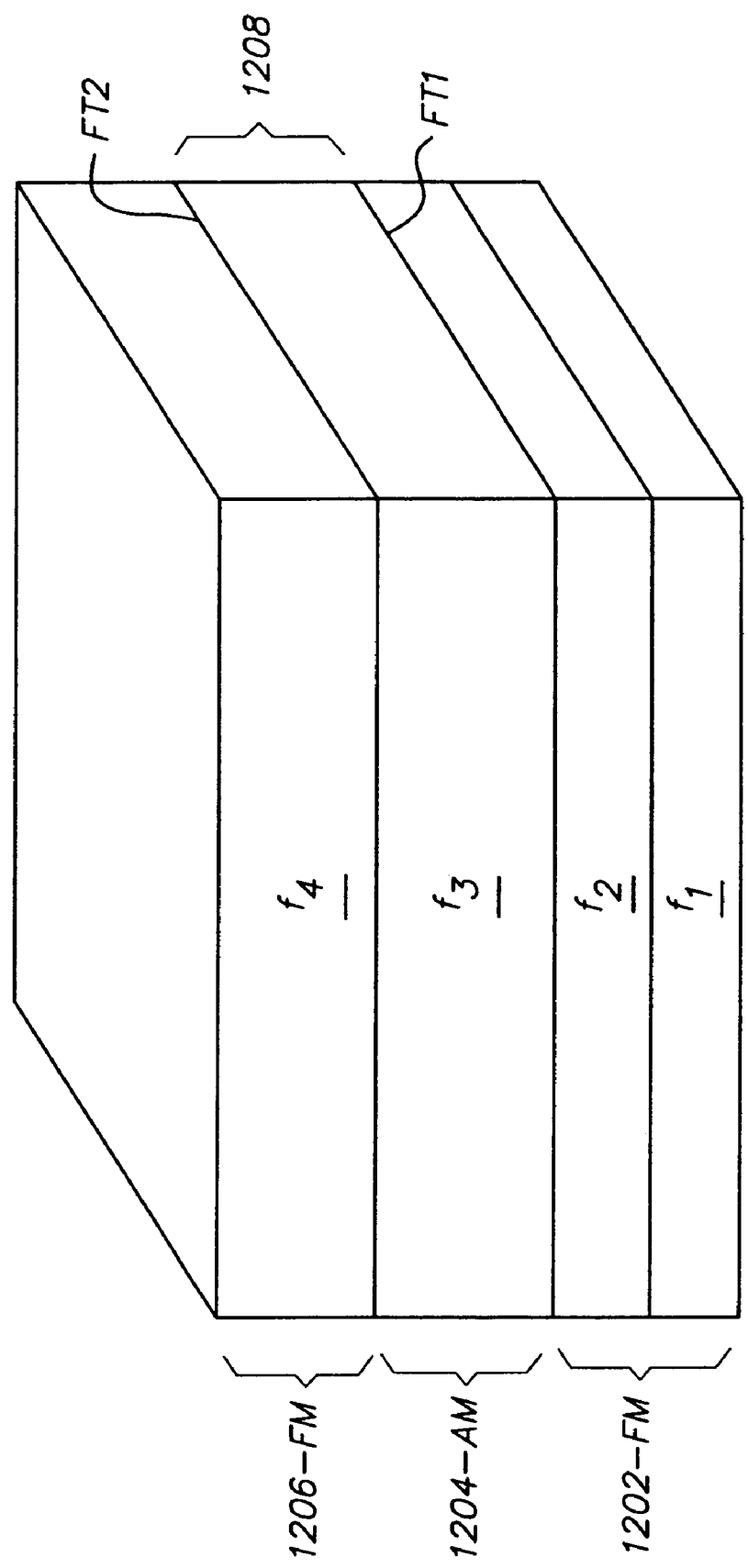
FIG. 12 illustrates a multilevel halftone screen, according to an embodiment of the present invention.

FIGS. 7 and 8 illustrate that the screen dots, as identified by their screen dot nuclei 720, are stochastically arranged. However, the invention is not limited to this arrangement, and all or portions of the 3D halftone screen 610 may be regularly arranged as an AM screen. For example, FIG. 12 illustrates one particular embodiment of the present invention that has different segments of a single screen having at least a different screen dot nuclei location arrangement. In this example embodiment, a midtone region 1208 has an arrangement of screen dot nuclei in a regular pattern corresponding to an AM screen 1204. The other planes 1202 and 1206 have a stochastic arrangement of screen dot nuclei corresponding to an FM screen. An advantage of this arrangement is that the stochastic pattern of screen dots in the toe region of the tone scale has been determined to aid in toner/ink adhesion when small dots are present, the stochastic pattern of screen dots in the high-intensity planes assists in the reduction of worm-like artifacts, and the regular pattern of screen dots in the midtone region, where toner/ink adhesion and worm-like artifacts are not a problem, may produce better results than a stochastic arrangement. Although FIG. 12 illustrates an FM-AM-FM arrangement, one skilled in the art will appreciate that other alternating stochastic/regular arrangements may be implemented without departing from the scope of the invention.

Although not required, the screen dot nuclei 720 are arranged, according to an embodiment of the present invention, such that the halftone screen 610 exhibits a green noise power spectrum, between approximately 150 and 250 lines per inch. A green noise power spectrum is useful for lower-resolution printing devices.

Although FIG. 7 illustrates a constant number of screen dot nuclei 720 in each of the plurality of planes, embodiments of the present invention have varying numbers of screen dot nuclei 720 in different sets of planes. For example, plane levels zero through 35 may each have X number of screen dot nuclei, whereas plane levels 36 through 255 may each have X+Y nuclei. Accordingly, one skilled in the art will appreciate that the 3D halftone screen 610 may have variable frequency depending on the tone region of the screen 610. For example, FIG. 12 illustrates that the FM set of planes 1202 may have multiple frequencies of screen dots F1, F2, where F1>F2 or F2>F1. Further, the AM set of planes 1204 may have another screen dot nucleus frequency F3, and the FM set of planes 1206 may have yet another screen dot nucleus frequency F4. Advantageously, at the transition point FTI of the FM region 1202 and the AM region 1204, the frequency of the transitional screen dot nuclei are equal, and the transitional screen dot nuclei are in the same or substantially the same locations between planes at the transition point. Similarly, at the transition point FT2 of AM 1204 to FM 1206, the frequency of the transitional screen dot nuclei advantageously also are equal, and the transitional screen dot nuclei are in the same or substantially the same locations between planes at the transition point. The details of achieving these results are described in more detail below with respect to FIG. 9. Having the same or substantially the same frequency and locations of screen dot nuclei at the above-discussed transitions ensures a smooth texture transition between a stochastic and regular screen dot nuclei arrangement.

Additionally, although FIGS. 7 and 8 illustrate a halftone screen wherein each plane is rectangular, one skilled in the art will appreciate that the three-dimensional structure of the halftone screen 610 may be modified to accommodate halftone screens having other shapes.

Further, although FIGS. 7 and 8, as well as this description, commonly describe the growth of screen dots throughout the halftone screen 610, some embodiments of the present invention grow "holes" instead of screen dots. A hole is essentially the inverse of a screen dot and represents locations where an exposure dot that has a non-maximum exposure intensity. These embodiments are the same as the screen dot embodiments described herein, including the methods of making the halftone screens described herein, except that instead of growing screen dots, holes are grown.

Figure 14:
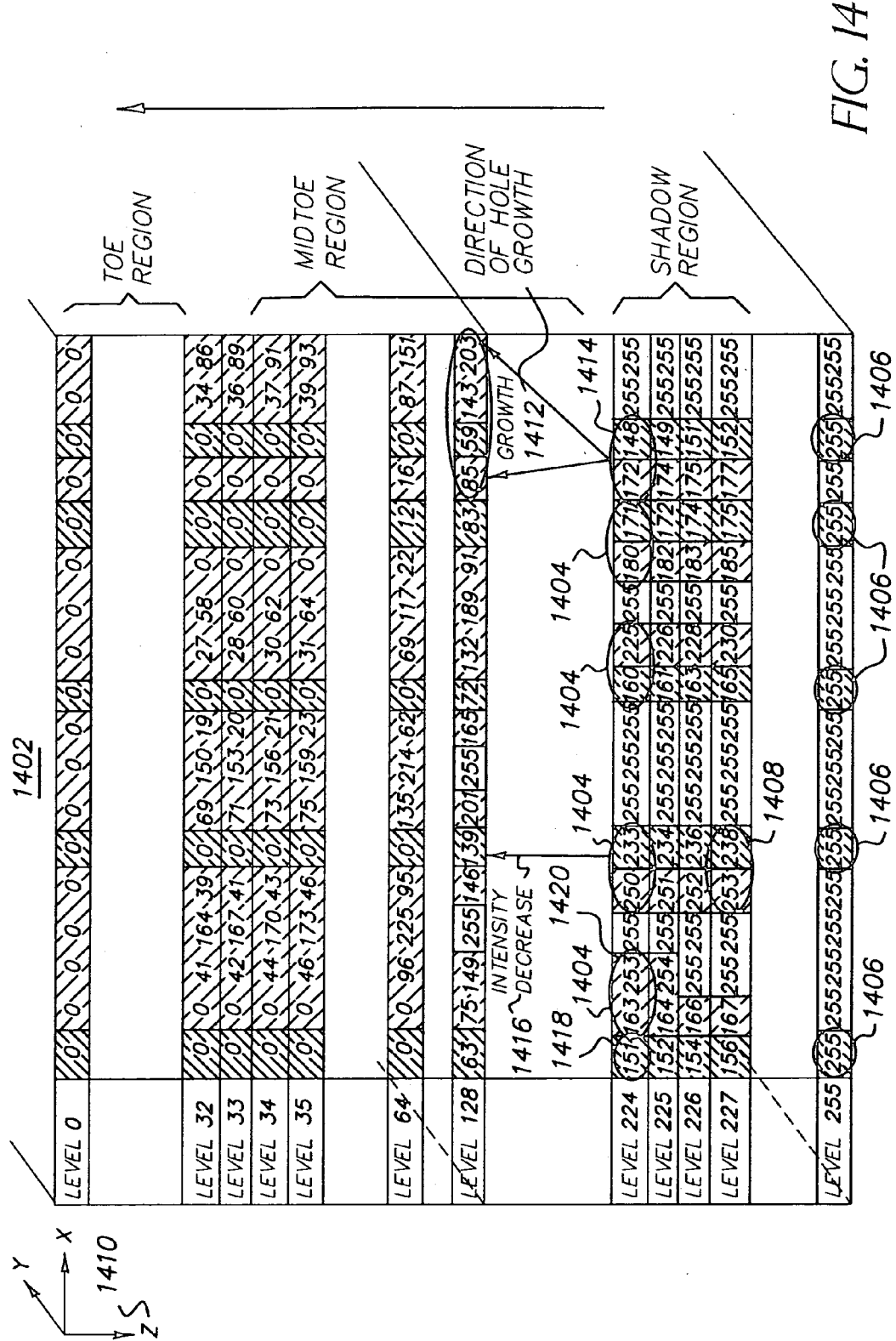
FIG. 14 illustrates hole growth in a multilevel halftone screen, according to an embodiment of the present invention.

A halftone screen 1402, according to one of these embodiments, is illustrated in FIG. 14. Each plane in the halftone screen 1402, except plane level 255 associated with an input RIPped pixel intensity value of 255 (maximum intensity), has a plurality of holes, some of which are shown in cross-section by reference numeral 1404. It should be noted, however, that semantically, plane level 255 may be considered to have holes 1406 associated with maximum exposure intensity. For ease of discussion, however, holes will be described as being associated with a non-maximum exposure intensity. In this regard, the holes are associated with one or more less-than-maximum-intensity exposure dots printed by a multilevel printing device or one or more non-printed exposure dots. For example, the hole 1408 in plane level 227 is associated with exposure intensity values of 253 and 238, both less than 255, the maximum intensity printed by an 8-bit multilevel printer.

As the halftone screen 1402 progresses along the Z-axis 1410 towards the toe region of the tone scale, the holes in the planes become larger. Such growth is illustrated, for example, with reference numeral 1412. Growth 1412 illustrates that the cross-section of the hole 1414 in plane level 224 grows from encompassing two exposure dot intensity values to encompassing four exposure dot intensity values in plane level 128. In addition, the holes, as well as growing in size along the Z-axis 1410 in a direction towards the toe region of the tone scale, also decrease in intensity along the Z-axis 1410 in the same direction, as shown by reference numeral 1416. According to an embodiment of the present invention, the holes are balanced in size with the screen dots in the mid-tone regions.

The holes in the halftone screen 1402 each include a nucleus (dark shaded table-cells in FIG. 14; see reference numeral 1418, for example), which stays in the same or substantially the same location from plane to plane. The nucleus represents the theoretical center (in a real-number space) of a hole, or the exposure dot (in the integer number/digital space represented by the halftone screen 1402) in which the theoretical center resides. For example, the theoretical center of the screen dot 1414 may reside at a location between the exposure dot with intensity value 148 and the exposure dot with intensity value 172, but somewhere closer to the center of the exposure dot with intensity value 148. In the process of digitizing the screen dots (converting from a real-number space to an integer-number space, described in detail below), the exposure dot with the intensity value 148 becomes the exposure dot in which the theoretical center resides.

As the holes grow in size along the Z-axis 1410 in the direction of the toe region of the tone scale, they include growing peripheral regions (lightly shaded table-cells in FIG. 14; see reference numeral 1420, for example). The peripheral regions border or surround the hole nucleus region.

Figure 15:
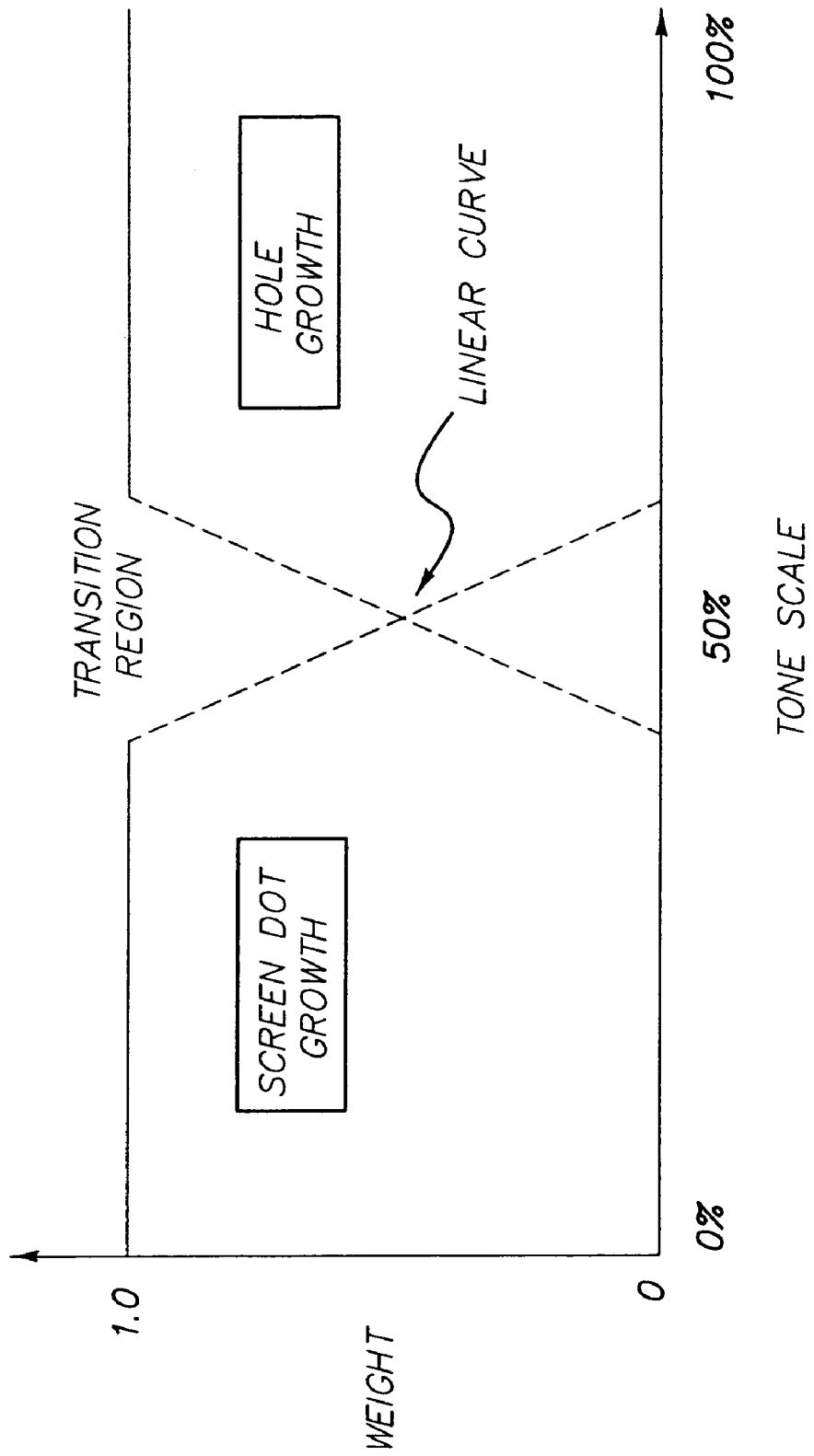
FIG. 15 illustrates blending of screen dots and holes, according to an embodiment of the present invention.

One embodiment of the present invention smoothly blends screen dots and holes along the tone scale such that screen dots appear in the mid-tone region of the tone scale and holes appear in the shadow to mid-tone region of the tone scale. The screen dots and holes are grown so that they balance each other out at the mid-tone region (in the range of approximately 45% to 55% of the tone scale) as illustrated with FIG. 15. The blending weights may vary plane-to-plane and, in particular, they can form either a linear or a nonlinear curve. According to this embodiment, the screen-dot-to-hole transition along the tone scale is smooth and produces pleasing results.

It should be noted that because the growth of holes in a halftone screen is essentially the same as growing screen dots, except for an inverting of intensity levels, the remainder of this description, as well as the claims, will refer to the phrase "screen dot" to generically refer to the growth of screen dots (as previously described) or, alternatively, the growth of holes. To elaborate, the phrase "screen dot" will hereinafter be used to refer to the growth of objects representing exposure dots having non-zero exposure intensities or, alternatively, the growth of objects representing exposure dots having non-maximum exposure intensities.

Figure 9:
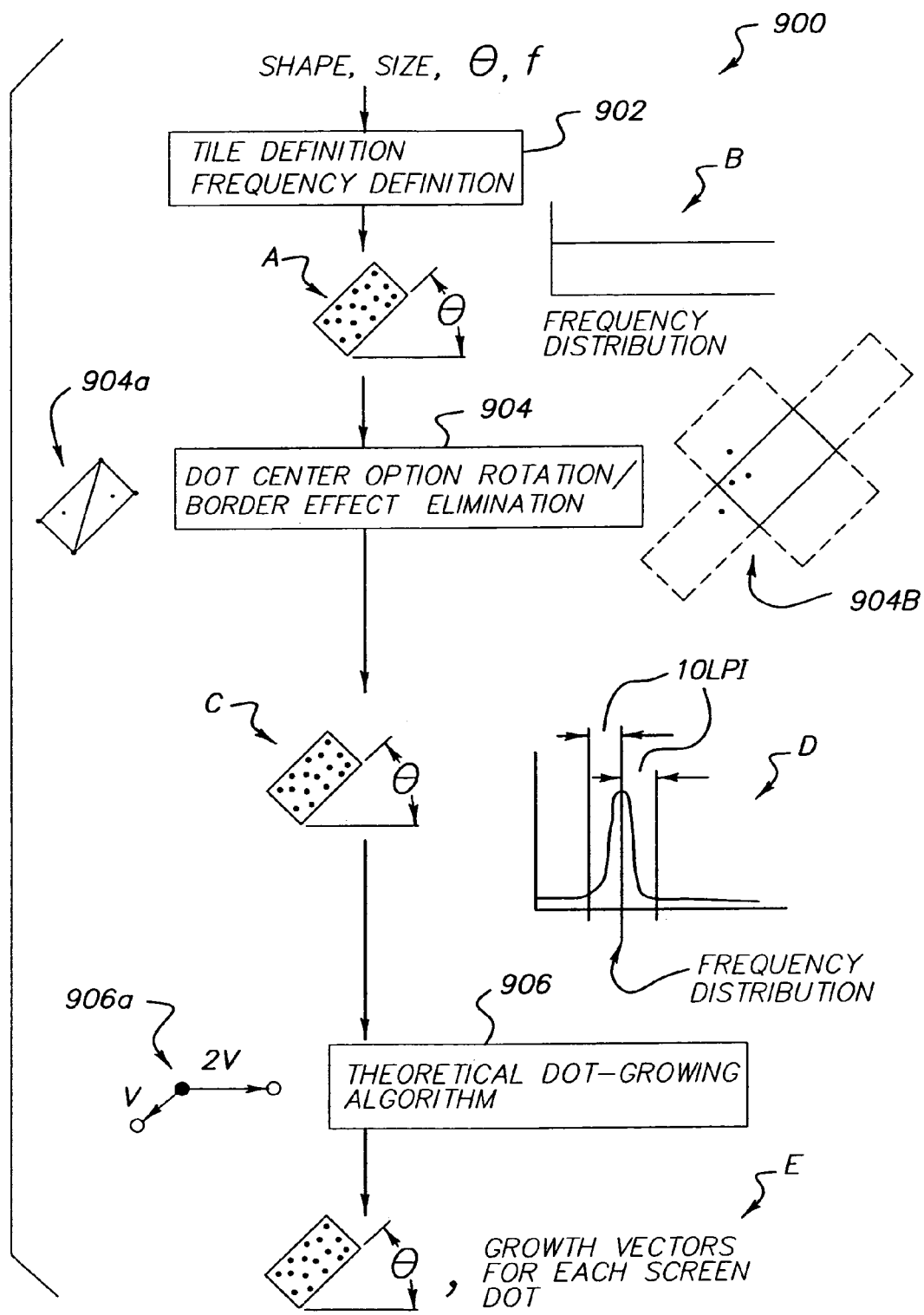
FIG. 9 illustrates a first portion of a process for making a multilevel halftone screen, according to an embodiment of the present invention.

FIG. 9 illustrates a method 900 for generating a three-dimensional halftone screen, according to an embodiment of the present invention. The embodiment of FIG. 9 begins at step 902 where a user inputs a shape of a tile (that may be replicated to make up a plane of the halftone screen), e.g., a square, a rectangle, an octagon, etc.; a size of the tile, such as a size specified by a number of exposure dots in two dimensions; an angle theta, which defines the angle at which the tile is to be rotated; and a frequency F defining the number of screen dots that are present in each of the planes of the halftone screen. As will be discussed in more detail below, not all planes need to have the same number of screen dots, but for ease of an initial description, a constant number (or frequency F) of dots will be assumed.

The processing performed at step 902 by the multilevel halftone processing system 602 generates a tile A meeting the specified shape, size, angle, and frequency. The tile A may have a random distribution of screen dot nuclei of frequency F and a frequency distribution B. As will be discussed in more detail below, the screen dot nuclei distribution need not be stochastic and, instead of being generated, may be specified by the user or some other source. The tile A with frequency distribution B is used at step 904 to perform dot center optimization and border effect elimination. The processing performed at step 904 by the multilevel halftone processing system 602 utilizes the Voronoi algorithm or other algorithm known in the art to redistribute the screen dot nuclei to have a spectrum with a frequency distribution D centered around or substantially around frequency F. In other words, the frequency distribution D may have a peak value at or substantially near the frequency F, which tails off within a predetermined spread, which may be approximately 10 lines per inch.

If the Voronoi algorithm is used at step 904, such algorithm essentially draws triangles between the screen dot nuclei specified in tile A, and recenters the screen dot nuclei into the centers of such generated triangles, as shown at 904A in FIG. 9. The triangles are formed between the closest screen dot nuclei to any particular screen dot nuclei. The border effect elimination performed at step 904 takes into account the distance between screen dot nuclei that would be present if tile A were repeated, as shown at 904B. The result of the processing performed at step 904 is a tile C having redistributed screen dot nuclei with distribution D.

The processing performed at steps 902 and 904 occur in a real number space. Consequently, the screen dot nuclei in tile C are theoretical centers having locations defined as real numbers. In order to prevent clipping of the exposure intensity values associated with the screen dots due to subsequent digitization processes performed at step 908, such nuclei locations may be shifted to their nearest integer location, especially in the toe region of the tone scale.

The tile C with frequency distribution D is used at step 906 to generate screen-dot-growth vectors for each of the screen dots using a theoretical dot-growing algorithm at step 906. According to an embodiment of the present invention, triangulation is used to generate such growth vectors such that the screen dots grow at a speed toward adjacent screen dot nuclei that allows the screen dots to contact all adjacent screen dots "simultaneously" (i.e., in the same plane) or nearly "simultaneously." In other words, a screen dot grows slowly towards adjacent screen dots that are nearby and grows quickly towards adjacent screen dots that are distant, such that the screen dot contacts the nearby screen dot and the distant screen dot simultaneously or nearly simultaneously. Stated differently, the screen dot, as it is growing from plane level zero to plane level 255, for example, contacts the nearby screen dot and the distant screen dot at plane level 204, for instance, or within the plane level range of 201-207, for instance.

An example of this growing scheme is illustrated at 906A where a screen dot has a vector 2V that instructs the screen dot to grow twice as fast towards a screen dot that is twice as far as a screen dot in a direction V. Although this dot-growing algorithm has advantages in reducing worm-like artifacts because all dots connect simultaneously or nearly simultaneously, one skilled in the art will appreciate that other dot-growing algorithms may be used. Output from step 906 is the tile C unchanged as well as a set of growth vectors for each of the screen dots. Each of the growth vectors indicates a direction and a speed at which a screen dot grows in size. Although the invention is not so limited, the growth vectors may specify that the dots grow at a uniform speed between planes.

Figure 10:
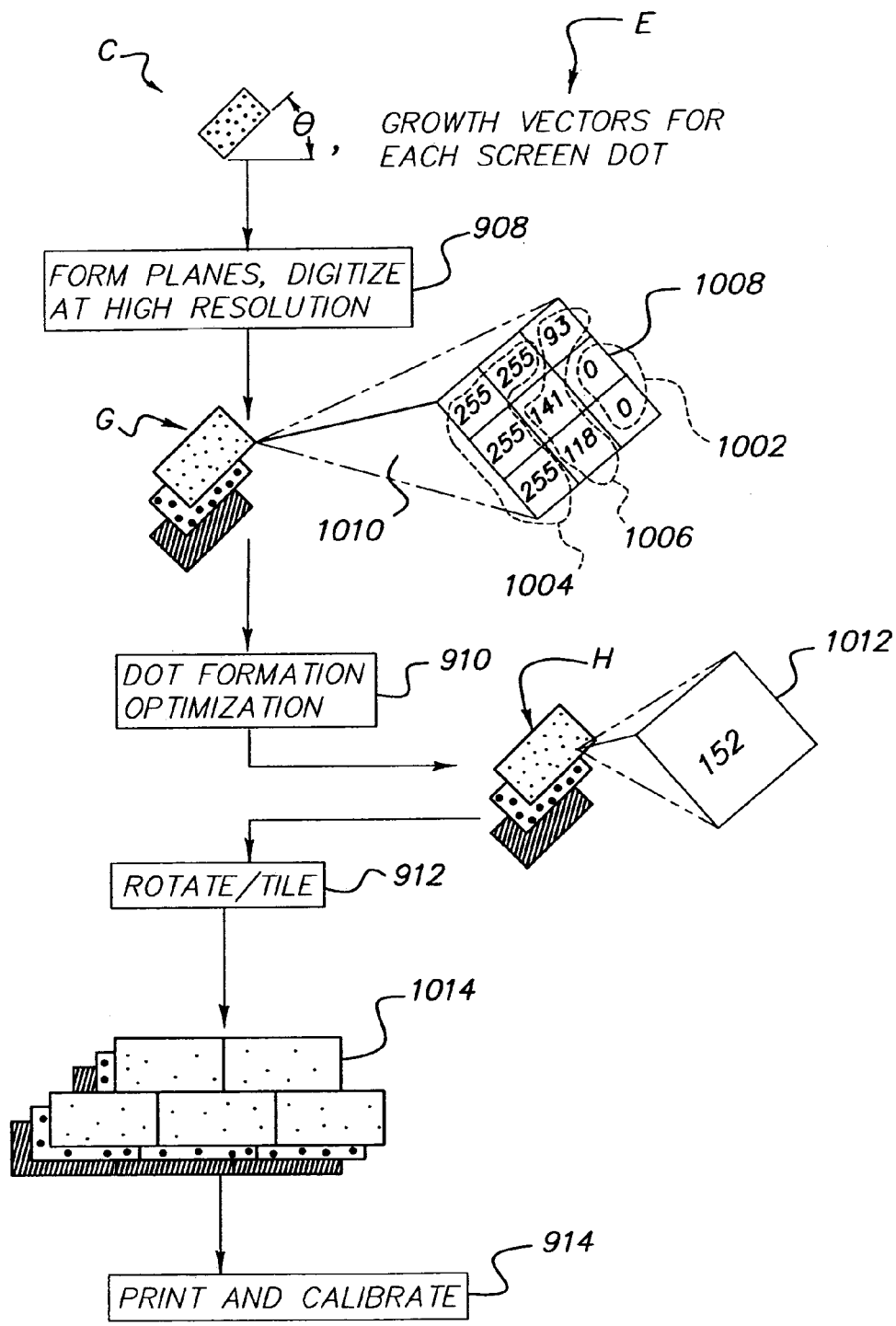
FIG. 10 illustrates a second portion of a process for making a multilevel halftone screen, according to an embodiment of the present invention.

FIG. 9 continues on to FIG. 10 where, at step 908, the information from step 906 is used to form the plurality of planes of the three-dimensional halftone screen, according to an embodiment of the present invention. In other words, for each subsequent plane along the Z-axis 706 in FIG. 7, the screen dot nuclei 720 are grown in both intensity and size as indicated by the growth vectors. For example, for 8-bit multilevel printing, each screen dot should reach its maximum size and intensity after 255 planes. If a linear growth scheme is used and a growth vector indicates that a screen dot should grow by a distance of X at plane 255, such screen dot should have grown half as much at plane 128.

After growing the screen dots through all of the planes in a real-number space, the planes are digitized at step 908 at high resolution, where each dot, 1002 for example, is represented in 8-bits (or some other multi-bit representation, such as 16-bits). The number of bits per dot at this step need not match the bit level of the multilevel printer. According to an embodiment of the present invention, the planes are digitized at step 908 at a resolution greater than approximately 5,000 dots per inch. However, any resolution greater than the printer resolution is recommended, but not required.

Digitization at high resolution minimizes data loss at this point in the screen generation process. After digitizing the planes at high resolution, the screen dots within the planes appear as seas of maximum intensity, or "255 s" in the case of 8-bit dots (as shown, for example, at 1004 in FIG. 10), with greater-than-zero intensity edges (as shown, for example, at 1006). (In the case of holes being used as screen dots, the screen dots appear as seas of no intensity, or "0 s" with less-than-maximum intensity edges.) Areas on the planes that do not have screen dots appear as dots having no intensity, or "0 s" (as shown, for example, at 1008). (In case of holes being used as screen dots, areas on the planes that do not have screen dots appear as dots having maximum intensity.) The output of step 908 is the three-dimensional screen G akin to that illustrated in FIG. 7, but at high resolution.

At step 910, the three-dimensional screen G may be subjected to a large Gaussian, or averaging, filter. A large averaging filter is preferable to eliminate worm like artifacts present in conventional FM screens. However, one skilled in the art will appreciate that a large filter is not necessary, and that other filter sizes may be used. In one embodiment of the present invention, the large averaging filter is an 11×11 filter.

After averaging, if performed, the resolution of the screen G is reduced to match that of the printer resolution. For example, the group of high-resolution pixels 1010 are reduced to the single exposure dot 1012 having an exposure intensity value of 152 by averaging the nine intensity values in the group of high-resolution pixels 1010. The single exposure dot 1012 represents the smallest unit of exposure that the printer is capable of printing.

At step 912, the optimized screen from step 910 is converted to an equivalent zero-degree tile and tiled in a manner compatible with the tile's shape and is ready to be applied to an input digital contone CMYK image. The output halftone screen 1014 of step 912 is akin to the halftone screen shown in FIG. 7. It should be noted that the tiling performed at step 912 may not be necessary if the tile size matches the dimensions of the input digital contone CMYK image being halftoned.

At step 914, an image may be printed using the halftone screen 1014. Upon printing, a densitometer may be used to calibrate the exposure intensity values generated at step 910 when reducing the high-resolution screen G to screen H having a resolution that matches the printer. For example, a densitometer may be used to determine that the exposure intensity value of 152 (shown by reference numeral 1012) did not actually print an exposure dot with (152/255)=59.6% coverage. Accordingly, the exposure intensity value(s) may need to be calibrated so that they actually produce exposure dots having their expected coverage or some other desired coverage.

It should be noted that, although the above descriptions describe high-resolution dots 1002, for example, in an integer-number space, such dots may have intensity values, instead, in a real-number space to avoid data loss. For example, a dot in the screen G could have an intensity value of 0.5529411 . . . instead of having an 8-bit intensity value of 141 to prevent data loss when converting a real number to an integer. Final conversion to an integer-number space may wait until reduction to the printer resolution at step 910, after applying any filters, such as the averaging filter.

According to some embodiments of the present invention, the entire 3D halftone screen, such as the one illustrated in FIG. 7, does not have a constant frequency of screen dot nuclei and/or does not have screen dot nuclei of substantially equal locations throughout the entire halftone screen. Referring back to FIG. 7, for example, a portion of the halftone screen, such as a first plurality of planes of the halftone screen, may have a frequency F1 of screen dot nuclei 720. A second plurality of planes of the halftone screen 610, may have a different frequency F2 of screen dot nuclei 720. Alternatively, a first plurality of planes of the halftone screen 610 may have screen dot nuclei that remain in the same or substantially the same position throughout those first plurality of planes. However, throughout a second plurality of planes of the halftone screen 610, screen dot nuclei 720 may be present that also have the same or substantially the same location, but have a different location than those of the first plurality of planes of the halftone screen 610.

Figure 11:
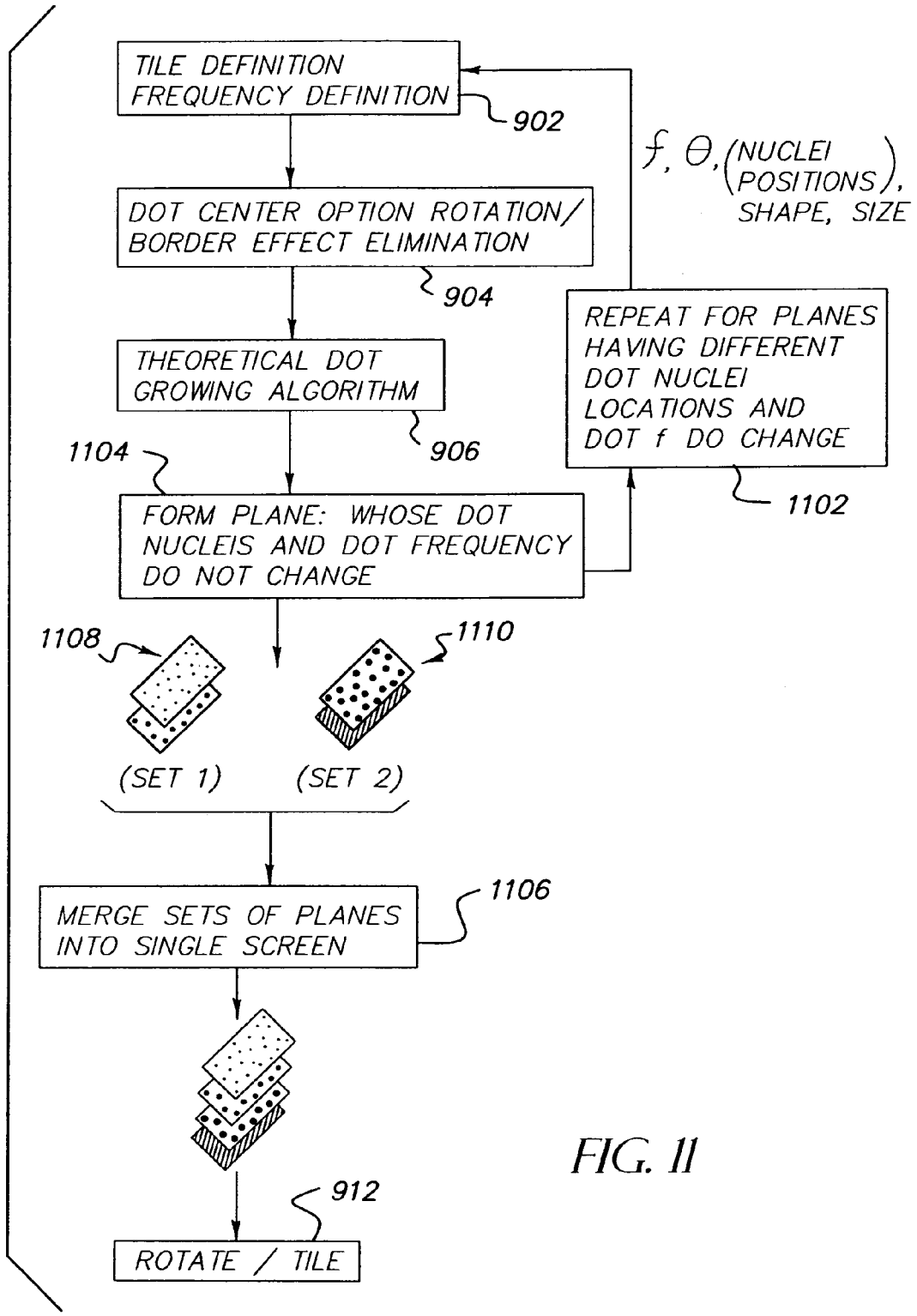
FIG. 11 illustrates another process for making a multilevel halftone screen, according to an embodiment of the present invention.

FIG. 11 illustrates how halftone screens having different frequencies of screen dots or different screen dot nuclei locations may be produced, according to an embodiment of the present invention. FIG. 11 includes several steps performed the same as the steps described with respect to FIGS. 9 and 10, above. However, FIG. 11 differs from FIGS. 9 and 10 at step 1104. In essence, the procedure of FIGS. 9 and 10 are performed in FIG. 11 until step 1104. In particular, an initial tile is generated according to definition at step 902, the screen dot nuclei locations are optionally optimized at step 904, and screen dot growth vectors are generated at step 906. Note that the optimization step 904 is optional, especially if the screen dot nuclei locations are provided by step 1102, described below. In this situation, it may be that the screen dot nuclei locations provided by step 1102 already are optimized.

At step 1104, only those contiguous planes in the halftone screen where dot nuclei locations and dot frequency do not change or do not change substantially throughout the contiguous planes are generated similar to that described above with respect to step 908 in FIG. 10. For example, a first plurality of planes (e.g., set one) having screen dot nuclei that remain in the same or substantially the same location and having a constant number of screen dots, are generated at 1104. If the halftone screen includes a second contiguous plurality of planes (e.g., set two) having either or both a different frequency of screen dots or different screen dot nuclei locations than those in the first plurality of planes, then steps 902 through 1104 are repeated for the second plurality of planes. In this situation, at step 1102, the shape, size, angle theta, and the frequency for the second plurality of planes may be known. It may also be that the nuclei locations for a second plurality of planes also are known at step 1102 and input into step 902, such that step 902 does not have to randomly generate screen dot nuclei locations. For example, if the halftone screen has a segment of planes having regularly patterned screen dots such as in an AM screen, the positions of such screen dots may be input at step 902 as known locations, thereby obviating the need to randomly generate new locations for the screen dots. Regardless of whether the screen dot locations are known or are generated at step 902, the output of step 902 is still an initially generated tile whose dot centers may be optimized at step 904. Such screen dots have growth vectors generated for them at step 906, and the second plurality of planes are then generated at step 1104 as shown as set two 1110. After each of these sets of planes are generated through iterations of steps 902, 904, 906, 1104, and 1102, the sets of planes are merged into a single screen at step 1106. After step 1106, the entire halftone screen is generated at step 912 as described above with respect to FIGS. 9 and 10.

It should be noted that at step 1104, when a subset of planes of a halftone screen are generated according to screen dot growth vectors, such planes are generated to have screen dot sizes commensurate with the RIPped pixel intensity level associated with them. For example, if a set of planes at step 1104, are generated, for example, between an intensity level of 128 to 255, the first plane generated in such set at step 1104 (i.e., plane level 128) will have screen dot sizes appropriate for an intensity level of a input RIPped pixel of 128. In other words, the initial plane generated for this set of planes at step 1104 will represent screen dots that have progressed in size according to their dot growth vectors a distance of 50% of their maximum traveled distance. This processing technique allows the second set of planes to be seamlessly merged with a set of planes that includes RIPped pixel intensity levels of 127 and less.

Figure 13:
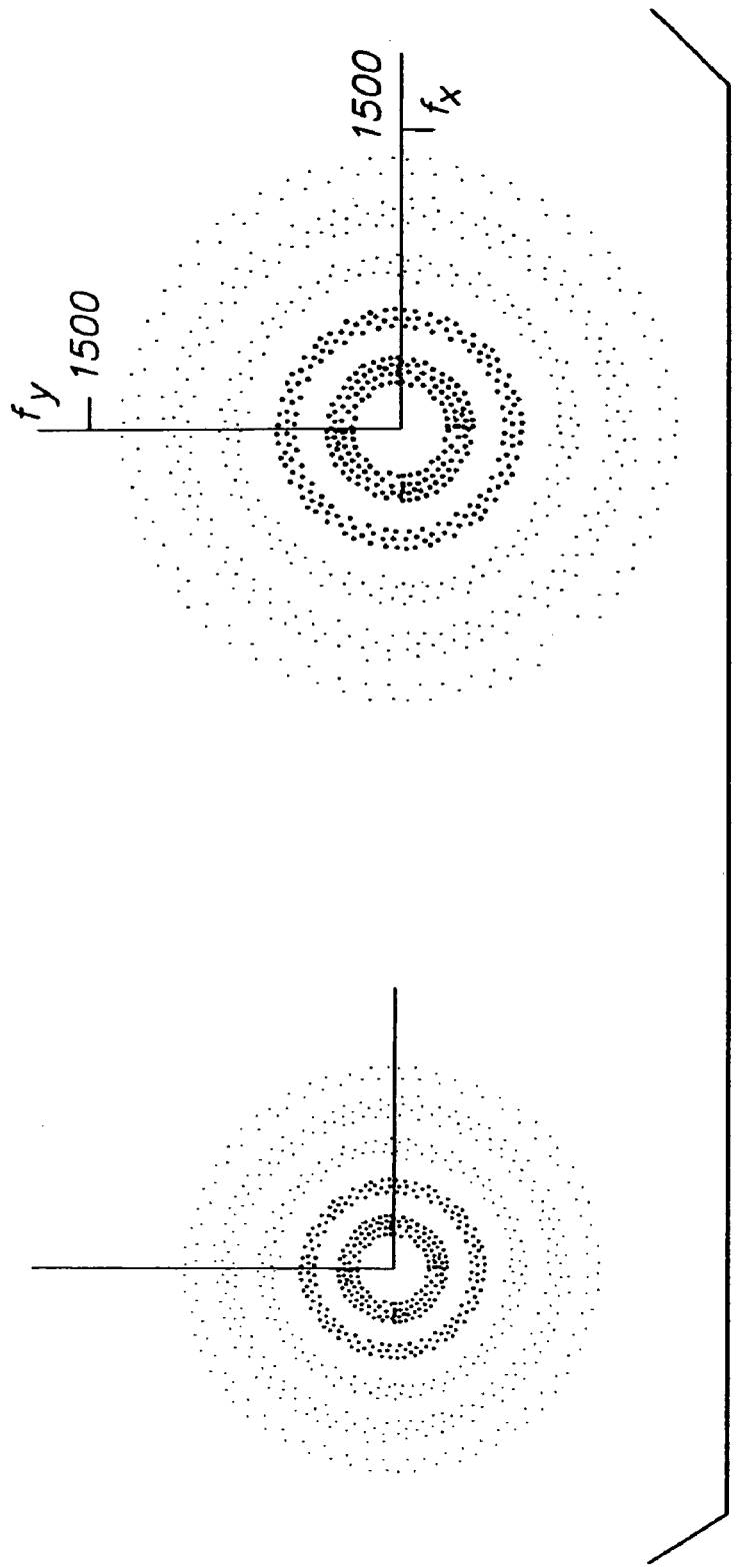
FIG. 13 illustrates frequency spectrums of sets of multilevel halftone screens, according to an embodiment of the present invention.

The description until this point has pertained to the structure and formation of a 3D halftone screen of a single color separation according to various embodiments of the present invention. FIG. 13 describes variations in frequency of halftone screens according to an embodiment of the present invention. In other words, FIG. 13 illustrates that 3D halftone screens generated according to an embodiment of the present invention should have a particular frequency with respect to other three-dimensional halftone screens created for other color separations according to embodiments of the present invention. In particular, according to an embodiment of the present invention, 3D halftone screens of a screen set preferably are at least 10 lines per inch (lpi) apart in frequency compared to any other screen in the set. Preferably, a set of screens for several color separations are greater than 20 lpi apart. For example, if four screens have been generated: one for cyan, one for magenta, one for yellow, and one for black, no two screens should be closer than 10 lpi, and preferably 20 lpi in frequency. An advantage of this arrangement is that it ensures that screen dot nuclei are evenly spread out among the different color separations. Otherwise, an uneven interaction between screen dot nuclei causes image artifacts.

It is to be understood that the exemplary embodiments are merely illustrative of the present invention and that many variations of the above-described embodiments can be devised by one skilled in the art without departing from the scope of the invention. For example, the present specification commonly describes the structure of a 3D halftone screen. However, it is not material to the invention how such structures are represented as data or as computer-accessible memories. One skilled in the art will appreciate that any manner of representing the structures herein as data readable by a processor may be used. Further, although the invention is commonly described in the context of 8-bit printers, one skilled in the art will appreciate that the invention applies to multi-level printers printing any number of bits. It is therefore intended that all such variations be included within the scope of the following claims and their equivalents.

PARTS LIST

A tile
B frequency distribution
C tile
D frequency distribution
F frequency
F2 frequency
G screen
H screen
V direction
2V vector
0-255 plane levels
102 input source
104 input source
106 input source
108 capture device
110 capture device
112 capture device
114 data file
116 printing device
118 printing device
120 printing device
122 RIP
124 CMYK data
126 single RIPped pixel
128 RTP data
130 halftone process
132 halftone process
134 RTP data
140 patterned dot halftoning
141 8-bit intensity value
142 RTP data
144 patterns
146 halftone cell
148 multilevel halftone process
150 RTP data
152 exposure dots
201-207 plane level range
501 halftone screen
502 screen dots
503 exposure dot
504 RTP data
505 digital contone data
507 exposure intensity value
510 AM screen
511 FM screen
600 halftone processing system
602 multilevel halftone processing system
604 data storage system
606 RIPped pixel data
608 exposure dot intensity value 610 3D halftone screen
702 X-axis
704 Y-axis
706 Z-axis
708 screen dots
710 screen dot
714 reference numeral
716 screen dot
718 exposure dot cross-section
720 screen dot nucleus
722 peripheral regions
724 reference numeral
730 screen dots
750 holes
752 exposure dot
802 row
900 method
902 step
904 step
904A step
904B step
906 step
906A step
908 step
910 step
912 step
914 step
1002 high-resolution dots
1004 step
1010 high-resolution pixels
1012 single exposure dot
1014 output halftone screen
1102 step
1104 step
1106 step
1108 step
1110 two sets
1202 plane
1204 AM screen
1206 plane
1208 midtone region

What is claimed is:

1. A method performed, at least in part by one or more computers, for generating a multilevel halftone screen, the method comprising the steps of:
    receiving tile definition data describing a tile definition such tile definition includes a tile shape, a tile angle, screen dot nuclei frequency, and a tile size;
    generating a tile based at least upon the tile definition data, the tile having a plurality of screen dot nuclei;
    improving locations of the plurality of screen dot nuclei in the tile;
    growing peripheral regions around each of the screen dot nuclei in each of a plurality of successive planes of the halftone screen such planes having a shape and a size consistent with the tile shape and the tile size;
    rotating the plurality of successive planes to zero degrees;
    generating copies of the plurality of planes; and
    logically merging the copies of the plurality of planes side-by-side to cover an image to be subjected to halftone processing.

2. The method of claim 1, wherein the tile definition data is provided by a user.

3. The method of claim 1, wherein the tile definition data is provided by a computer-executable process.

4. The method of claim 1, wherein the generating step generates the tile with screen dot nuclei having a stochastic arrangement.

5. The method of claim 1, wherein the generating step generates the tile with screen dot nuclei having a regular arrangement.

6. The method of claim 1, wherein the improving step redistributes screen dot nuclei such that they exhibit a frequency distribution centered or substantially centered around the screen dot nuclei frequency.

7. The method of claim 1, wherein the improving step accounts for distances between screen dot nuclei when improving screen dot nuclei locations.

8. The method of claim 7, wherein the improving step accounts for tile cross-border distances between screen dot nuclei when improving screen dot nuclei locations.

9. The method of claim 1, wherein the improving step uses a Voronoi or a Voronoi-like algorithm to facilitate improving screen dot nuclei locations.

10. The method of claim 1, wherein the screen dot nuclei remain in a fixed or a substantially fixed location in each of the plurality of successive planes of the halftone screen.

11. The method of claim 1, wherein the growing step grows the screen dot peripheral regions at speeds proportional to distances of nearby screen dot nuclei.

12. The method of claim 1, wherein the growing step grows the screen dot peripheral regions such that peripheral regions contact each of a plurality of nearby screen dot nuclei simultaneously or nearly simultaneously.

13. The method of claim 1, wherein the screen dot nuclei is associated with an exposure intensity of a multilevel printer, wherein the screen dot peripheral regions are associated with one or more exposure intensities of the multilevel printer, wherein the method further comprises the steps of:
    digitizing the plurality of planes generated by the growing step at a high resolution, thereby resulting in digitized exposure intensities represented by the screen dot nuclei and the screen dot peripheral regions; and
    averaging the digitized exposure intensities associated with the digitized screen dot nuclei.

14. The method of claim 13, wherein the averaging step is performed with a large Gaussian filter.

15. The method of claim 14, wherein the large Gaussian filter is an 11×11 filter.

16. The method of claim 1, further comprising the steps of:
    determining second tile definition data describing a second tile definition;
    generating a second tile based at least upon the second tile definition data, the second tile having a second plurality of screen dot nuclei;
    improving locations of the second plurality of screen dot nuclei in the second tile;
    growing second peripheral regions around each of the second plurality of screen dot nuclei in each of a second plurality of successive planes of the halftone screen; and
    logically merging, one on top of the other, the plurality of successive planes and the second plurality of successive planes of the halftone screen.

17. The method of claim 16, wherein the second tile definition includes a second tile shape, a second tile angle, a second screen dot nuclei frequency, and a second tile size.

18. The method of claim 17, wherein the second tile shape, the second tile angle, and the second tile size equal the tile shape, the tile angle, and the tile size, respectively.

19. The method of claim 17, wherein the second screen dot nuclei frequency differs from the screen dot nuclei frequency.

20. The method of claim 16, wherein the second tile definition data is provided by a user.

21. The method of claim 16, wherein the second tile definition data is provided by a computer-executable process.

22. The method of claim 16, wherein the second tile is generated with screen dot nuclei having a stochastic arrangement.

23. The method of claim 16, wherein the second tile is generated with a regular arrangement.

* * * * *